(12) United States Patent
Kitani

(10) Patent No.: US 8,159,972 B2
(45) Date of Patent: Apr. 17, 2012

(54) NETWORK MANAGEMENT APPARATUS AND SWITCHING APPARATUS

(75) Inventor: Makoto Kitani, Yokohama (JP)

(73) Assignee: ALAXALA Networks Corporation, Kanagawa (JP)

( * ) Notice: Subject to any disclaimer, the term of this patent is extended or adjusted under 35 U.S.C. 154(b) by 442 days.

(21) Appl. No.: 11/948,016

(22) Filed: Nov. 30, 2007

(65) Prior Publication Data

US 2008/0186875 A1    Aug. 7, 2008

(30) Foreign Application Priority Data

Feb. 1, 2007 (JP) ................................ 2007-022928

(51) Int. Cl.
*H04L 12/28* (2006.01)
*H04L 12/56* (2006.01)
(52) U.S. Cl. .................... 370/254; 370/351; 370/389
(58) Field of Classification Search ........................ None
See application file for complete search history.

(56) References Cited

U.S. PATENT DOCUMENTS

| 2003/0182445 | A1* | 9/2003 | Smith et al. | 709/238 |
|---|---|---|---|---|
| 2005/0254429 | A1* | 11/2005 | Kato et al. | 370/238 |
| 2006/0067350 | A1* | 3/2006 | Clevy et al. | 370/419 |
| 2007/0118568 | A1 | 5/2007 | Kitani et al. | |

FOREIGN PATENT DOCUMENTS

| JP | 4484803 | 4/2010 |
|---|---|---|
| WO | WO 2004/004252 | 1/2004 |

OTHER PUBLICATIONS

R. Droms, Network Working Group Request for Comments: 2131, Bucknell University, Mar. 1997.
David C. Plummer, Network Working Group Request for Comments: 826, Nov. 1982.
IEEE Standards 802.1AB, Location and metropolitan area networks, May 6, 2005.

* cited by examiner

*Primary Examiner* — Chirag Shah
*Assistant Examiner* — Srinivasa Reddivalam
(74) *Attorney, Agent, or Firm* — Antonelli, Terry, Stout & Kraus, LLP.

(57) ABSTRACT

A network management apparatus is for managing a plurality of switching devices that relay data through a data communication network. The network management apparatus includes a configuration information storage, a connectivity relationship detector and a configuration information modifier. The configuration information storage stores first configuration information. The first configuration information is configured in the switching devices and includes information to be determined in accordance with connectivity relationships among the switching devices. The connectivity relationship detector detects changes of connectivity relationships among the switching devices. The configuration information modifier dynamically modifies the first configuration information in accordance with detected changes of connectivity relationships.

6 Claims, 21 Drawing Sheets

Fig.3

| PATH NAME | DEVICE NAME X | CONNECTION PORT X | DEVICE NAME Y | CONNECTION PORT Y |
|---|---|---|---|---|
| BB-1F | 110A | 0/5(P1) | 110B | 0/1(P1) |
| BB-2F | 110A | 0/10(P2) | 110C | 0/1(P2) |
| 1F-2F | 110B | 0/7(P2) | 110C | 0/10(P1) |

Fig.4

| DEVICE NAME 151 | CURRENT CONFIGURATION INFORMATION 152 | NEW CONFIGURATION INFORMATION 153 | DEVICE IDENTIFIER 154 | COMMUNICATION STATUS 155 | IP ADDRESS 156 | TEMPORARY IP ADDRESS 157 |
|---|---|---|---|---|---|---|
| 110A | CONF_A1 | - | 00:00:00:00:00:01 | CONNECTED | 192.168.0.2 | - |
| 110B | CONF_B1 | - | 00:00:00:00:00:02 | CONNECTED | 192.168.0.3 | - |
| 110C | CONF_C1 | - | 00:00:00:00:00:03 | DISCONNECTED | 192.168.0.4 | - |

```
vlan Sales_div {
 vlan_id 10
 ip 10.1.10.1/24
}
vlan Market_div {
 vlan_id 20
 ip 10.1.20.1/24
}
vlan Managed {
 vlan_id 100
 ip 192.168.0.2/24
} port 0/5 {
 description"BB-1F"
 tagged vlan 10,100
}
port 0/6 {
 tagged vlan 10,100
}
port 0/10 {
 description"BB-2F"
 tagged vlan 20,100
}
port0/11 {
 tagged vlan 20,100
}
```

Fig.6

```
vlan Market_div {
 vlan_id 20
}
vlan Managed {
 vlan_id 100
 ip 192.168.0.4/24
} port 0/1 {
 description"BB-2F"
 tagged vlan 20,100
}
port 0/5 {
 untagged vlan 20
}
port 0/6 {
 untagged vlan 20
}
port0/10 {
 tagged vlan 100
}
```

| CONNECTION PORT | DEVICE IDENTIFIER | PAIRED PORT | COMMUNICATION STATUS |
|---|---|---|---|
| 0/5(P1) | 00:00:00:00:00:02(110B) | 0/1(P1) | CONNECTED |
| 0/10(P2) | 00:00:00:00:00:03(110C) | 0/1(P1) | DISCONNECTED |
| – | – | – | – |

Fig.17

```
vlan Market_div {
 vlan_id 20
}
vlan Managed {
 vlan_id 100
 ip 192.168.0.4/24
}
vlan Test {
 vlan_id 200
ip 20.0.0.4/24
} port 0/1 {
 description"BB-2F"
 tagged vlan 20,100,200
}
port 0/5
 untagged vlan 20
}
port 0/6 {
 untagged vlan 20
}
port0/10 {
 tagged vlan 100
}
```

Fig.18

```
vlan Sales_div {
 vlan_id 10
 ip 10.1.10.1/24
}
vlan Market_div {
 vlan_id 20
 ip 10.1.20.1/24
}
vlan Managed {
 vlan_id 100
 ip 192.168.0.2/24
}
vlan Test {
 vlan_id 200
} port 0/5 {
  description"BB-1F"
  tagged vlan 10,100
}
port 0/6 {
  tagged vlan 10,100
}
port 0/10 {
  tagged vlan 20,100
}
port0/11 {
  description"BB-2F"
  tagged vlan 20,100,200
}
```

Fig.19

| 150 | | | | | | |
|---|---|---|---|---|---|---|
| 151 | 152 | 153 | 154 | 155 | 156 | 157 |
| DEVICE NAME | CURRENT CONFIGURATION INFORMATION | NEW CONFIGURATION INFORMATION | DEVICE IDENTIFIER | COMMUNICATION STATUS | IP ADDRESS | TEMPORARY IP ADDRESS |
| 110A | CONF_A2 | – | 00:00:00:00:00:01 | CONNECTED | 192.168.0.2 | – |
| 110B | CONF_B1 | – | 00:00:00:00:00:02 | CONNECTED | 192.168.0.3 | – |
| 110C | CONF_C2 | – | 00:00:00:00:00:03 | CONNECTED | 192.168.0.4 | – |

Fig.20

| PATH NAME | DEVICE NAME X | CONNECTION PORT X | DEVICE NAME Y | CONNECTION PORT Y |
|---|---|---|---|---|
| BB-1F | 110A | 0/5 | 110B | 0/1 |
| BB-2F | 110A | 0/11 | 110C | 0/1 |
| 1F-2F | 110B | 0/7 | 110C | 0/10 |

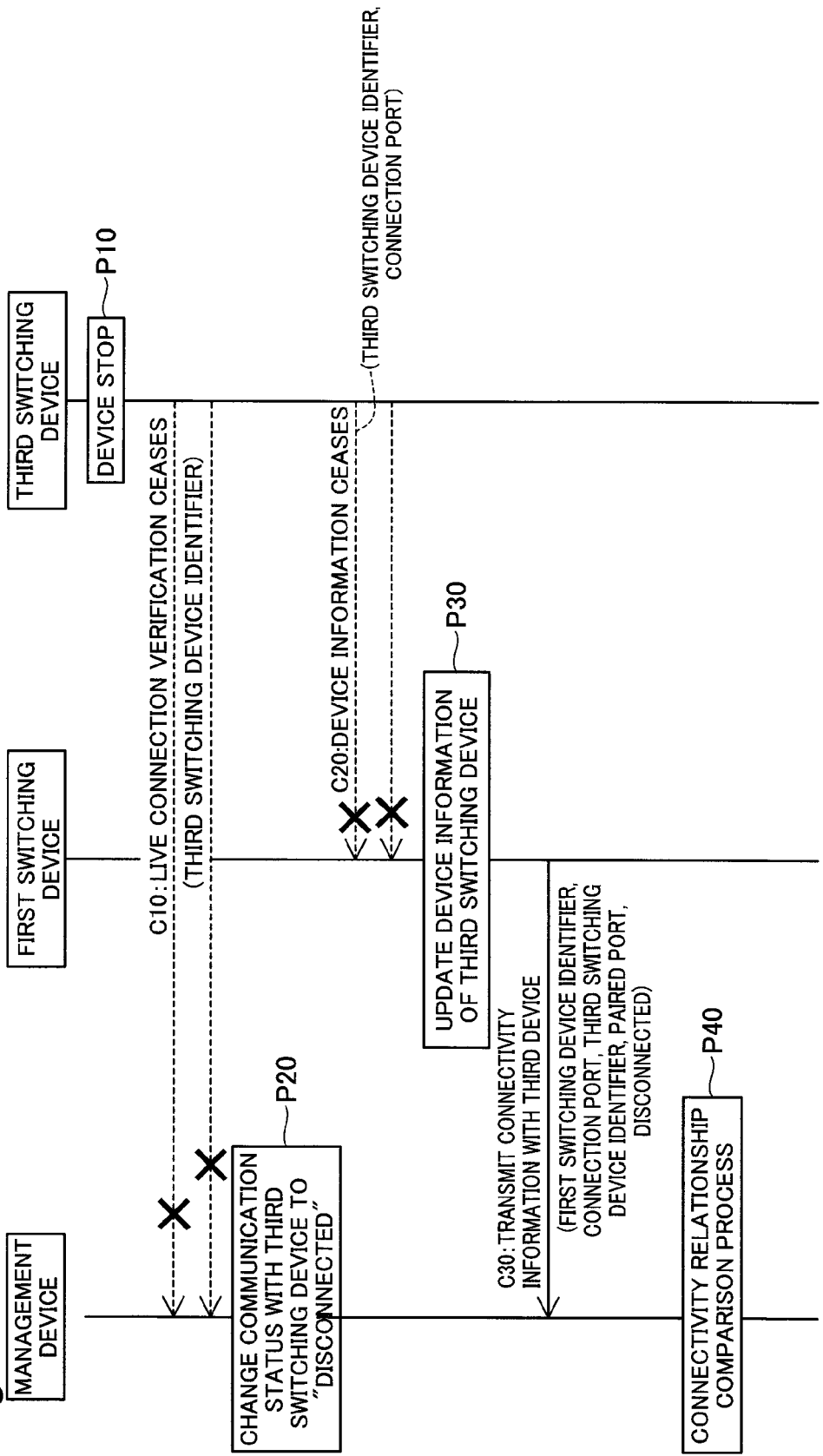

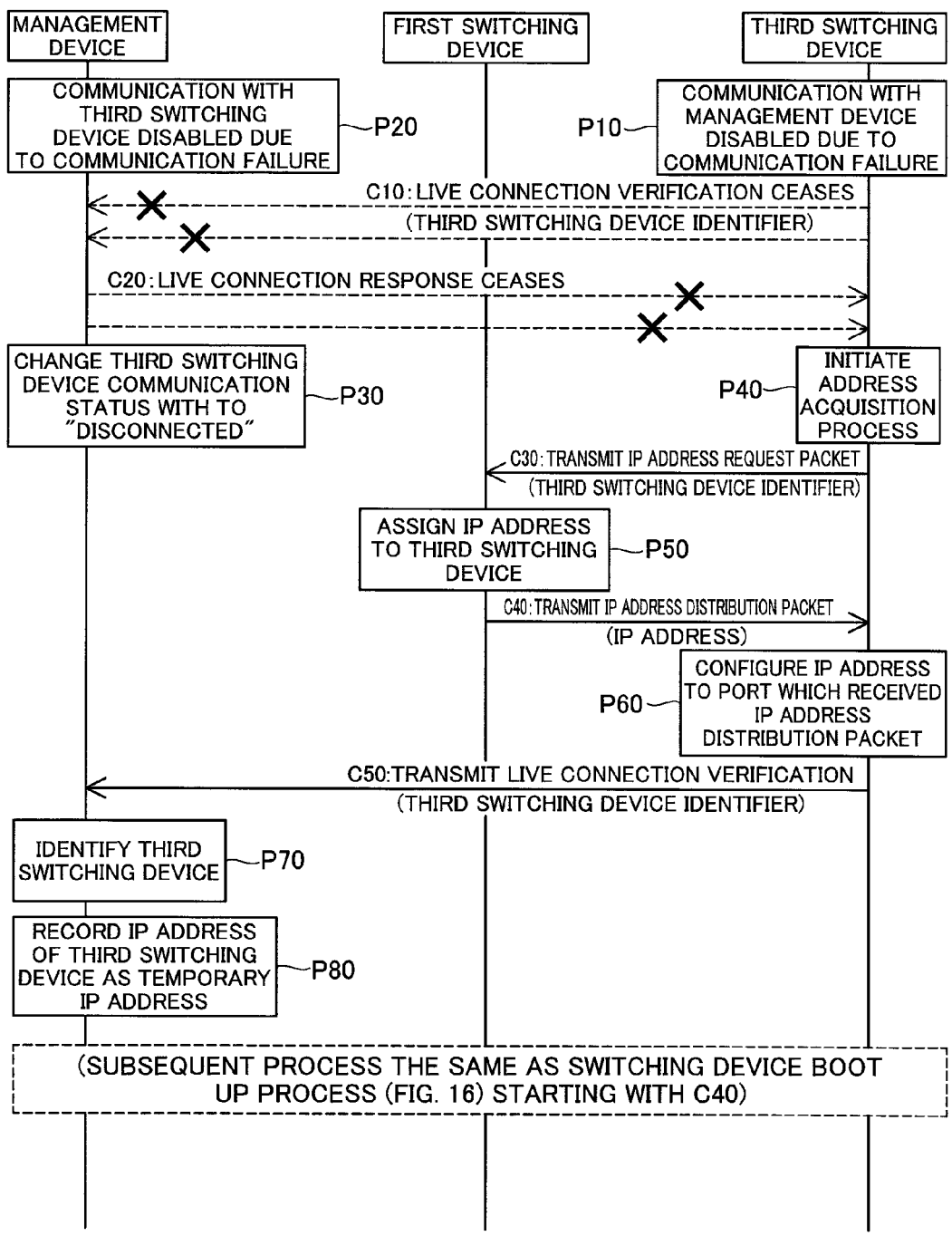

NETWORK MANAGEMENT APPARATUS AND SWITCHING APPARATUS

CROSS REFERENCE TO RELATED APPLICATIONS

This application relates to and claims priority from Japanese Patent Applications No. 2007-22928, filed on Feb. 1, 2007, the entire disclosure of which is incorporated by reference.

BACKGROUND

1. Technical Field

The present invention relates to technology for managing a switching device in network operation.

2. Description of the Related Art

Currently available switching devices have been designed on the assumption that they will be operated in distributed autonomous mode. This is because switching devices are the devices that provide communication accessibility, and because the transfer functionality of a switching device must not come to a stop even if communication with the server managing the switching device should be interrupted. For this reason, switching devices are not designed to operate according to instructions from other devices, but instead to operate based on internal configuration information made in the switching device.

DHCP (Dynamic Host Configuration Protocol) is one means for acquiring and setting external IP addresses for the purpose of enabling communications; however, DHCP can only acquire IP addresses, and cannot acquire all of the information needed for communication with other switching devices.

Another means for enabling communication is automatic learning using ARP (Address Resolution Protocol) or automatic learning of the MAC address belonging to a switching device. Many switching devices have an automatic learning function for learning the MAC addresses for use in communications by Ethernet™; however, owing to existence of VLAN (Virtual Local Area Network) or other technologies for logical division of communications, learning MAC addresses does not automatically mean that communication is possible. For example, if it is attempted to communicate with a switching device connected to a link that belongs to a first VLAN, packets will not arrive where these are from a client terminal or switching device connected to a link belonging to a second VLAN. Moreover, the principal purpose of automatically learning MAC addresses is to minimize broadcasting. Using broadcast packets, a switching device can communicate with other switching devices, servers, and clients whose MAC addresses are unknown to the broadcasting switching device. While the broadcast packets will get through to other switching devices, servers, and client terminals belonging to a given VLAN, they are not transferred to different VLANs. Thus, using broadcast packets, a switching device belonging to a first VLAN will not be able to communicate with a switching device belonging to a second VLAN.

However, where such transfers employ IP addresses rather than MAC addresses, communication among network devices connected to different VLANs will be possible. Such transfers by IP address are possible if routing information has been correctly set in the switching device.

ARP has the same problem described above, since it involves saving associations among IP addresses and MAC addresses, and using the IP address to ascertain the MAC address belonging to a device. That is, even where a switching device uses ARP, if the configuration information of the switching device is not correct, it will not be able to communicate with a device belonging to a different VLAN, despite learning its MAC address.

The range of possible communication among multiple switching devices can be expanded through exchange of mutual authentication information and of routing information they hold. Addresses, identifiers etc. of paired switching devices are set as configuration information in the switching devices. A switching device can communicate with a paired switching device on the basis of the configuration information. In the event that the switching device configuration information is correct, and the network cables or optical fibers have been wired correctly as designed, the switching devices will be able to communicate properly with the paired network device, and initiate exchange of routing information and so on.

LLDP (Link Layer Discovery Protocol), which enables a switching device to transmit its own information unilaterally in order to ascertain the presence of and some information regarding neighboring network devices, is dependent upon configuration information as to sending and receiving of packets from the appropriate port, but is not dependent upon addresses or authentication information of switching devices. For this reason, LLDP is known as a method for ascertaining information of switching devices irrespective of switching device configuration information. Information that can be ascertained through LLDP includes switching device identifiers, and information for physical ports that transmitted packets.

If configuration information in switching devices, such as addresses or identifiers of paired switching devices, have been made in error, communication among switching devices will not be possible. This issue could conceivably be addressed by a method of representing the connection between two switching devices by a "path," and inputting configuration information relating to the path by way of path information, in order to update configuration information according to the connection between two switching devices. The use of such path information can eliminate setting errors between the two switching devices.

However, while it is possible to make configuration information appropriately in the two switching devices by using correct path information, in the event that the path information is in error, it will of course not be possible to set appropriate configuration information. Moreover, it is difficult to obtain correct path information from configuration information for the two switching devices. The reason is that while information for a paired switching device has been set in the configuration information of a switching device, two potential problems exist, namely, that:

1. the actual physical wiring of network cables or optical fibers may not have been wired correctly as designed; and
2. since switching devices are designed for distributed autonomous operation, it is possible that through direct login to a switching device its configuration may have been changed without regard to paired network devices or to physical wiring. Thus, the configuration information will not necessarily be correct.

Consequently, even if the configuration information includes description of "communications ports of paired devices" and so on, such configuration information may not be reliable for the purpose of creating path information.

In this regard, it would be possible to enable configuration to be made only from a management device, and to disable changes to configuration information made by direct login to switching devices, thereby ensuring the integrity of configuration information. However, by so doing it will no longer be possible to perform a restore operation on a switching device in the event that it can no longer communicate with the management device; therefore, such changes to configuration information through direct login must be permitted. While it would be conceivable to allow changes to be made to configuration information through direct login only in those exceptional instances where communication with the management device is not possible, and to enable configuration to be made only from the management device at other times, this is not really a solution, since the same problem will be confronted when communication with the management device becomes possible.

SUMMARY

An advantage of some aspects of the invention is to provide technology for managing configuration information held by switching devices, and for maintaining multiple managed switching devices in a state of enabled communication.

A first aspect of the present invention provides a network management apparatus for managing a plurality of switching devices that relay data through a data communication network. The network management apparatus pertaining to the first aspect comprises a configuration information storage, a connectivity relationship detector and a configuration information modifier. The configuration information storage stores first configuration information. The first configuration information is configured in the switching devices and includes information to be determined in accordance with connectivity relationships among the switching devices. The connectivity relationship detector detects changes of connectivity relationships among the switching devices. The configuration information modifier dynamically modifies the first configuration information in accordance with detected changes of connectivity relationships.

According to the network management apparatus pertaining to the first aspect, a change in connectivity among switching devices will be detected, and the configuration information managed in the network management apparatus will be modified dynamically in response to the detected change. Thus, by setting the modified configuration information in the switching devices, disabling of communication among switching devices under management may be prevented or largely avoided.

In the switching system pertaining to the first aspect, the connectivity relationship detector may include a path information storage, a connectivity information receiver and a connectivity relationship comparator. The path information storage may be for managing path information which includes connectivity relationships among the switching devices. The connectivity information receiver may receive connectivity information from one of the switching devices. The connectivity information may indicate connectivity relationships between another one of the switching devices and the one of the switching devices. The connectivity relationship comparator may acquire differences between connectivity relationships among the switching devices based on the received connectivity information, and connectivity relationships among the switching devices which have been recorded in the path information. The configuration information modifier may modify the first configuration information in accordance with the acquired differences. In this case, the managed configuration information is modified according to differences in connectivity being managed as path information versus connectivity based on received connectivity information. As a result, change in connectivity may be detected and the configuration information modified dynamically in response to the detected change.

The switching system pertaining to the first aspect may further comprise a configuration information acquirer that acquires second configuration information from one of the switching devices. The second configuration information may be currently configured in the one of the switching devices. The configuration information modifier may, referring to the second configuration information, modify the first configuration information. In this case, configuration information managed in the network management apparatus is modified with reference to the configuration information currently configured in the switching device. As a result, there is increased likelihood that managed configuration information may be modified in such a way as to maintain the switching devices in a communication-enabled state.

In the switching system pertaining to the first aspect, when the network management apparatus has established initial communication or previous interrupted communication with any of the switching devices, the configuration information acquirer may acquire the second configuration information from a switching device, among the switching devices, with which the network management apparatus has established the communication. When initial connection has been established or previously interrupted connection reestablished, there is a possibility that the configuration information managed in the network management apparatus will differ from the configuration information currently configured in the switching device. Where the configuration information currently configured in the switching device is acquired at such timing, the network management apparatus may acquire configuration information that is useful as reference information.

In the switching system pertaining to the first aspect, when a change of the connectivity relationship is detected, the configuration information acquirer may acquire the second configuration information from a switching device, among the switching devices, associated with the detected change of the connectivity relationship. There is a possibility that configuration information currently configured in the switching device in relation to connectivity differences will differ from the configuration information managed in the network management apparatus. Accordingly, by acquiring configuration information currently configured in the switching device in relation to connectivity differences, the network management apparatus may acquire configuration information that is useful as reference information.

The switching system pertaining to the first aspect may further comprise a configuration information distributor. In the event that the first configuration information has been modified by the configuration information modifier, the configuration information distributor may distribute the modified first configuration information to a switching device, among the switching devices, corresponding to the modification. In this case, by distributing to and setting up post-modification first configuration information in the switching devices, disabling of communication among switching devices under management may be prevented or largely avoided.

In the switching system pertaining to the first aspect, the network management apparatus may store identifiers that identify each of the switching devices. The network management apparatus may further comprise a switching device identification module. In the event that the network management apparatus has established communication with any of the switching devices, the switching device identification module may identify using the identifiers a switching device, among the switching devices, with which the network management apparatus has established the communication. In such case, the identifiers may include data that, when the network management apparatus establishes the communication with any of the switching devices, exchanges between the network management apparatus and a switching device, among the switching devices, with which the network management apparatus has establishes the communication. In this case, since switching devices with which the network management apparatus has established the communication may be easily identified, management of multiple switching devices is simplified.

A second aspect of the present invention provides a switching device for relaying data through a data communication network, the switching device being managed by a network management apparatus. The switching device pertaining to the second aspect comprises a communication module, a configuration information transmitter and a connectivity information processor. The communication module communicates with the network management apparatus. The configuration information transmitter transmits local configuration information to the network management apparatus using the communication module. The connectivity information processor generates connectivity information which indicates connectivity relationships with other switching device and transmits the connectivity information to the network management apparatus using the communication module.

According to the switching device pertaining to a second aspect of the invention, the switching device transmits to the network management device connectivity information indicating local configuration information and connectivity with other switching devices. As a result, the network management device may manage the configuration information of the switching device and connectivity thereof with other switching devices, preventing or largely avoiding disabling of communication among switching devices under management.

In the switching device pertaining to the second aspect, the connectivity information processor may generate the connectivity information on the basis of information transmitted by the other switching device. In this case, the switching device generates connectivity information on the basis of information actually received from other switching devices. As a result, connectivity information may reflect actual connectivity.

The switching device pertaining to the second aspect may further comprise a live connection verification module that verifies communication with the network management apparatus. In this case, the network management device may easily ascertain communication status with the switching devices. As a result, the switching devices may be managed easily.

The switching device pertaining to the second aspect may further comprises a configuration information controller that transmits local configuration information in response to a request from the network management apparatus. In this case, the switching devices may easily ascertain configuration information currently configured in switching devices under management. As a result, the switching devices may be managed easily.

In the switching device pertaining to the second aspect, the configuration information controller may further configure configuration information distributed from the network management apparatus, as local configuration information. In this case, by distributing configuration information, the network management device may change the configuration information configured in the switching devices.

The switching device pertaining to the second aspect may further comprises an address acquirer. The address acquirer may acquire an address externally so that the communication module is communicatable with the network management apparatus, in the event that the communication module is not communicatable with the network management apparatus. In this case, even in the event that a switching device is not communicatable with the network management device at a specific address, it will nevertheless be able to acquire another address externally and communicate with the network management device. As a result, the likelihood of switching devices being able to maintain communication with the network management device may be improved.

A third aspect of the present invention provides a method of managing first configuration information configured in a plurality of switching devices that relay data in a data communication network. The first configuration information includes information to be determined in accordance with connectivity relationships among the switching devices. The method pertaining to the third aspect comprises detecting changes of connectivity relationships among the networks and dynamically modifying the first configuration information in accordance with detected changes of connectivity relationships.

According to the method pertaining to the third aspect, the similar functions and effects as the network management apparatus pertaining to the first aspect may be obtained. In addition, the method pertaining to the third aspect may also be actualized in a variety of aspects in a way similar to the network management apparatus pertaining to the first aspect.

The present invention may be realized in various aspects, for example, a network system included in the network management apparatus pertaining to the first aspect and the switching device pertaining to the second aspect, a control method of such network system. The invention may also be realized as a computer program used to realize functions of these network management apparatus, switching device, network system or method, and as a recording medium having such a computer program recorded thereon.

The above and other objects, characterizing features, aspects and advantages of the invention will be clear from the description of preferred embodiments presented below along with the attached Figures.

BRIEF DESCRIPTION OF THE DRAWINGS

FIG. 3 is a conceptual illustration of an exemplary path management table;

FIG. 4 is a conceptual illustration of an exemplary switching device management table;

FIG. 5 is a first illustration of exemplary configuration information stored in a switching device management table;

FIG. 6 is a second illustration of exemplary configuration information stored in a switching device management table;

FIG. 17 is an illustration depicting an example of configuration information that is configured in the third switching device when the third switching device is booted up in Specific Embodiment 1;

FIG. 18 is an illustration depicting an example of configuration information that is configured in the first switching device after the configuration information modification process in Specific Embodiment 1;

FIG. 19 is an illustration depicting the switching device management table after the configuration information modification process in Specific Embodiment 1;

FIG. 20 is an illustration depicting the path management table after the configuration information modification process in Specific Embodiment 1;

FIG. 21 is a sequence diagram depicting the Network System in Specific Embodiment 2; and FIG. 22 is a sequence diagram depicting the Network System in Specific Embodiment 3.

DETAILED DESCRIPTION OF THE PREFERRED EMBODIMENTS

Embodiments of the present invention will be described below with reference to the drawings.

A. Embodiment

General Configuration of Network System

Figure 1:
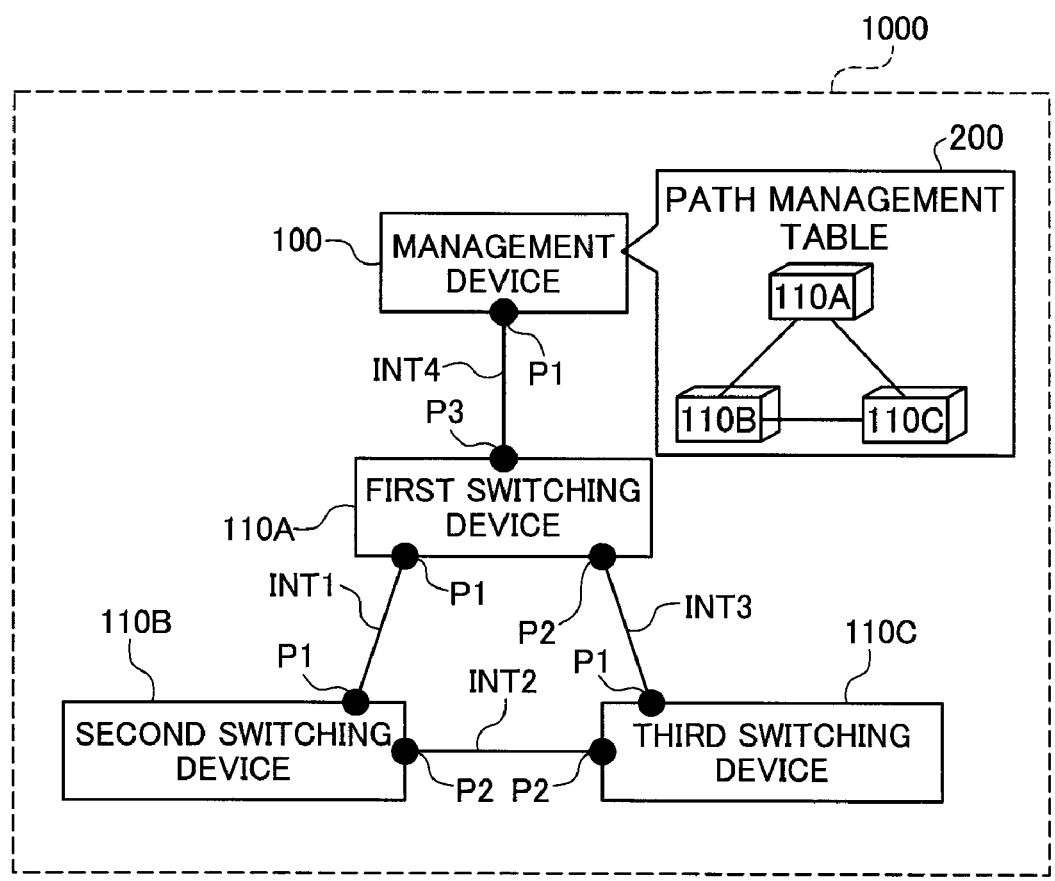
FIG. 1 is a block diagram depicting the general configuration of the Network System pertaining to the embodiment.

The general configuration of the Network System of the embodiment will be shown with reference to FIG. 1. FIG. 1 is a block diagram depicting the general configuration of the Network System pertaining to the embodiment. The Network System 1000 pertaining to the embodiment includes three switching devices, namely, a first switching device 110A, a second switching device 110B, and a third switching device 110C. Herein, in instances where there is no need to distinguish among the three switching devices, they will be denoted simply as switching device 110 with the letter suffix after the symbol omitted. The Network System 1000 also includes a management device 100. The management device 100 stores a path management table 200, discussed later. In FIG. 1, the path management table 200 is depicted in image form. The path management table 200 is a table that records connectivity among the switching devices under management by the management device 100 (in the present embodiment, the three switching devices 110A to 110C).

In FIG. 1, the black dots indicate ports (discussed later) provided to the devices. As shown in FIG. 1, the port P1 of the first switching device 110A and the port P1 of the second switching device 110B, the port P2 of the second switching device 110B and the port P2 of the third switching device 110C, and the port P2 of the first switching device 110A and the port P1 of the third switching device 110C are respectively connected via internal networks INT1, INT2, INT3. The port P3 of the first switching device 110A is connected to the port P1 of the management device 100 via an internal network INT4. In this way, the first switching device 110A has a direct connection to the management device 100. On the other hand, the second switching device 110B and the third switching device 110C have an indirect connection to the management device 100 via one or several other switching devices (in the present invention, the first switching device 110A).

While not illustrated in the drawing, some or all of the other ports of the three switching devices 110A through 110C may be connected to terminals outside the system or to other routers or switches via external networks.

Configuration of Management Device

Figure 2:
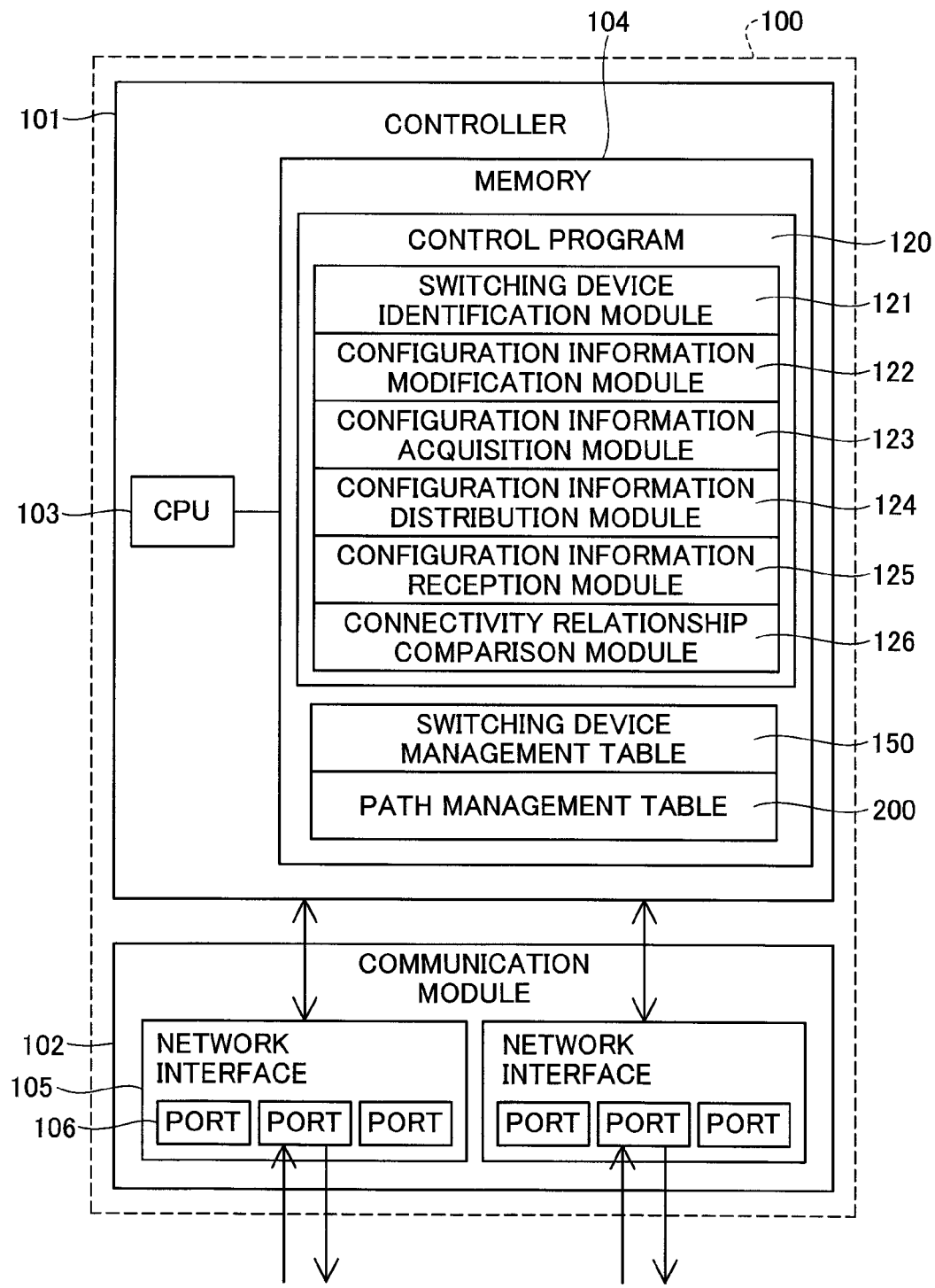
FIG. 2 is a block diagram showing the internal configuration of the management device.

The configuration of the management device 100 will be discussed with reference to FIGS. 2 through 6. FIG. 2 is a block diagram showing the internal configuration of the management device. FIG. 3 is a conceptual illustration of an exemplary path management table. FIG. 4 is a conceptual illustration of an exemplary switching device management table. FIG. 5 is a first illustration of exemplary configuration information stored in a switching device management table. FIG. 6 is a second illustration of exemplary configuration information stored in a switching device management table.

As depicted in FIG. 2, the management device 100 has a controller 101 and a communication module 102. The controller 101 includes a CPU 103 and a memory 104. In the memory 104 are stored a switching device management table 150, the aforementioned path management table 200, and a control program 120. The CPU 103 executes the control program 120 to carry out the functions of the management device 100.

The control program 120 includes several modules for carrying out functions of the management device; however, only those modules needed to describe the present embodiment are illustrated selectively in FIG. 2. The control program 120 includes a switching device identification module 121, a configuration information modifier 122, a configuration information acquisition module 123, a configuration information distribution module 124, a configuration information reception module 125, and a connectivity relationship comparison module 126. The process of managing the aforementioned switching device management table 150 and path management table 200, as well as various processes discussed later, are carried out by means of these modules.

The communication module 102 has a single or several network interfaces 105. The network interfaces 105 are each equipped with one or several ports 106 that contain a link such as coaxial cable or optical fiber. The network interfaces 105 are compliant with the Ethernet™ standard, for example. The port P1 of the management device 100 in FIG. 1 discussed earlier corresponds to any of the ports 106 in FIG. 2.

The path management table 200 will be discussed with reference to FIG. 3. The path management table 200 records connectivity relationships among switching devices under management by the management device 100; this information is used for the purpose of management by the management device 100. Connectivity relationships among switching devices are recorded using the concept of "paths." For example, where a port of a first switching device is connected to a port of another paired switching device, it is considered that a "path" has been formed between the first switching device and the other switching device in question. Path information defining such "paths" will be recorded as connectivity relationships in the path management table 200. The path information will include a path name 201 between switching devices; a device name (device name X) 202 of one switching device X forming the path indicated by the path name 201; an identifier (connection port X) 203 of the connection port of the switching device X connected to a paired switching device Y; a device name (device name Y) 204 of the other switching device Y forming the path indicated by the path name 201; and an identifier (connection port Y) 205 of the connection port of the switching device Y connected to the paired switching device X (see FIG. 3). For ease of understanding, in FIG. 3, the symbols of the corresponding ports (FIG. 1) are shown in parentheses, next to the connection port identifiers (these are not described in actual practice).

The path management table 200 shown in FIG. 3 indicates connectivity relationships between the first switching device 110A and the second switching device 110B, between the first switching device 110A and the third switching device 110C, and between the second switching device 1010B and the third switching device 110C, with the first switching device 110A port assigned the identifier 0/5 (hereinafter denoted as port 0/5) connected to the port 0/1 of the second switching device 110B, for example. The connectivity relationships recorded in the path management table 200 may be configured as initial configuration inter alia by a system administrator. As will be discussed later, connectivity relationships recorded in the path management table 200 will be modified dynamically during operation of the Network System 1000.

The switching device management table 150 will be described with reference to FIGS. 4 through 6. The switching device management table 150 records, for each individual switching device, configuration information, an identifier, and an IP address for communication purposes, this information being used for management by the management device 100. Specifically, as shown in FIG. 4, the switching device management table 150 describes a name 151 for a switching device; current configuration information 152 currently being managed as configuration information by the management device 100; new configuration information 153 representing configuration information acquired directly from a switching device; a device identifier 154 for identifying a switching device; communication status 155 indicating whether communication is established with a switching device; an IP address 156 for communicating with a switching device; and a temporary IP address 157 acquired on a temporary basis by a switching device.

If the management device 100 can communicate with the switching devices, a value indicating "connected" will be recorded in the communication status 155; in other states (e.g., where not determined by the switching device identification module 121, or where accessibility has been lost through connection of the link to the wrong port 106) a value indicating "disconnected" will be recorded.

The information needed during operation of the switching device 110 is configured in the configuration information. Specifically, the configuration information includes routing protocol settings, policy-based routing settings, and similar information. FIG. 5 shows an example of part of the current configuration information CONF_A1 (FIG. 4) of the first switching device 110A, specifically, that part relating to the connection ports (hereinafter termed port-related information). For example, in FIG. 5, VLAN identifiers (vlan-id) of tagged VLAN configured for individual ports are described. Specifically, it will be appreciated that a vlan-id=0 and a tagged VLAN of 100 have been configured for port 0/5 (middle of FIG. 5). It will further be appreciated that definition information defining the tagged VLAN is shown in FIG. 5 (top of FIG. 5). Similarly, FIG. 6 depicts an example of port-related information included in the current configuration information CONF_A1 (FIG. 4) of the third switching device 110C.

As will be apparent from the preceding description, in the present embodiment, the memory 104 corresponds to the configuration information storage and the path information storage recited in the claims.

Switching Device Configuration

Figure 7:
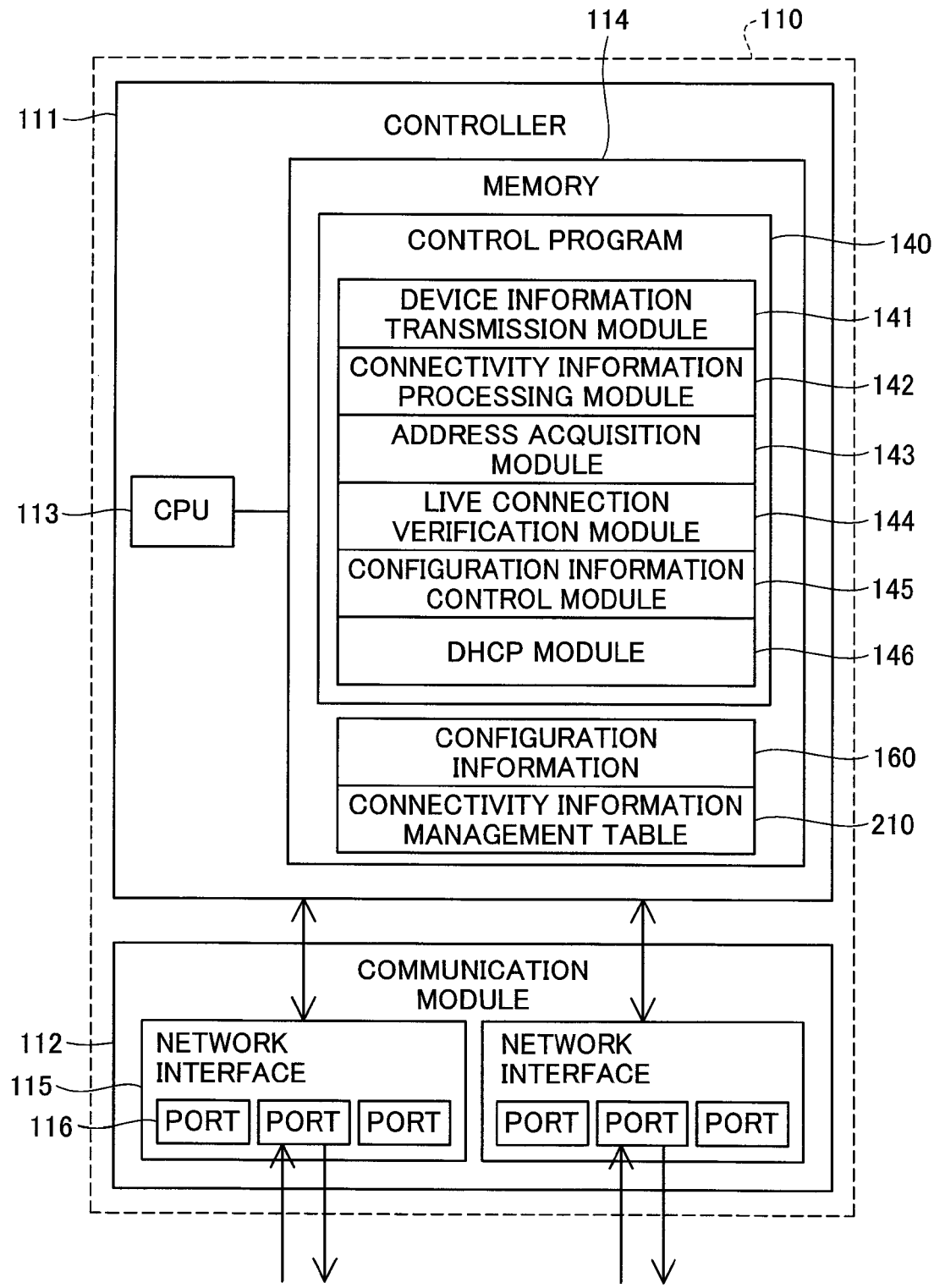
FIG. 7 is a block diagram depicting the internal configuration of the switching device.
Figures 8, 9:
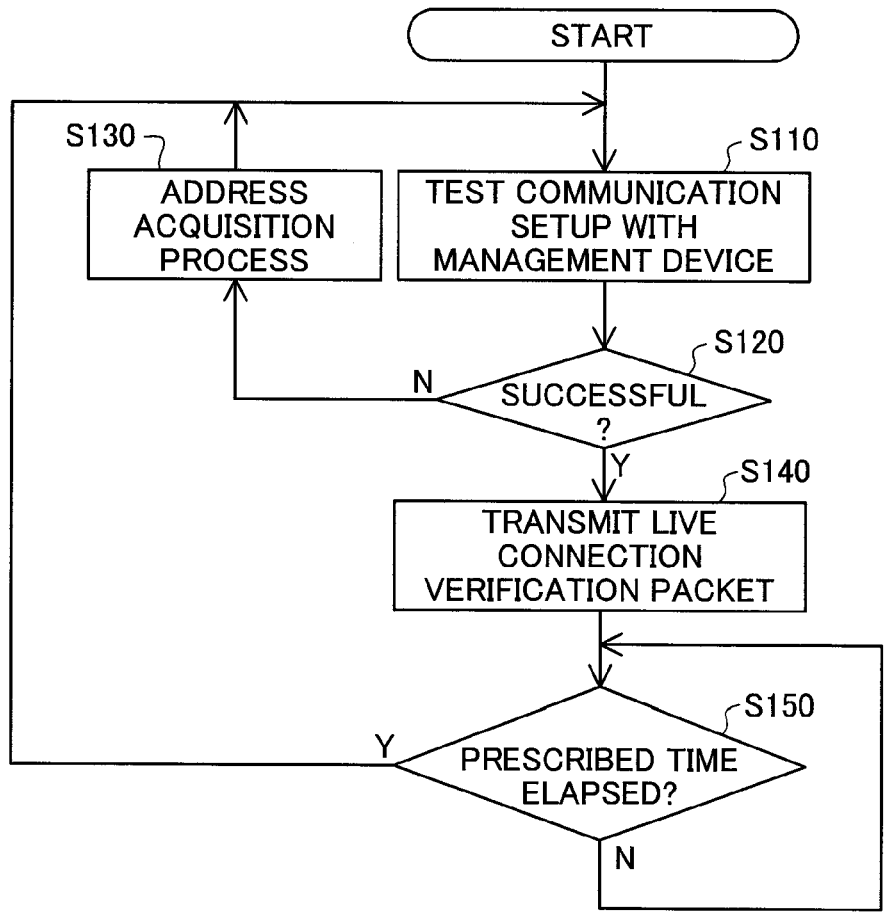
FIG. 8 is a conceptual diagram showing an exemplary connectivity information management table.
FIG. 9 is a flowchart depicting the processing routine of a process relating to live connection verification in the switching device.

The configuration of the switching devices 110A to 110C will be described with reference to FIGS. 7 and 8. The switching devices are identical in configuration and will therefore be discussed in terms of the configuration of a representative switching device 110 having the letter suffix after the symbol omitted. FIG. 7 is a block diagram depicting the internal configuration of the switching device. FIG. 8 is a conceptual diagram showing an exemplary connectivity information management table.

The switching device 110 includes a controller 111 and a communication module 112. The controller 111 includes a CPU 113 and a memory 114. Configuration information 160 for the device in question and a connectivity information table 210 are stored in the memory 104. A control program 140 is also stored in the memory. The CPU 113 executes the control program 140 in order to carry out the functions of the switching device 110.

The control program 140 includes several modules for carrying out functions of the switching device; however, only those modules needed to describe the present embodiment are illustrated selectively in FIG. 7. The control program 140 includes a device information transmission module 141; a connectivity information processing module 142; an address acquisition module 143; a live connection verification module 144; a configuration information control module 145; and a DHCP module 146. The processes of managing the configuration information 160 and the connectivity information management table 210, as well as various processes discussed later, are carried out by means of these modules.

The communication module 112 has a single or several network interfaces 115. The network interfaces 115 are each equipped with one or several ports 116 that contain a link such as coaxial cable or optical fiber. The network interfaces 115 are compliant with the Ethernet™ standard, for example. The ports P1 to P3 of the switching devices 110A to 110C in FIG. 1 discussed earlier correspond to any of the ports 116 in FIG. 7.

The connectivity information management table 210 will be discussed with reference to FIG. 8. FIG. 8 depicts the connectivity information management table 210 stored in the first switching device 110A by way of a specific embodiment. The connectivity information management table 210 saves device information sent by other paired switching devices 110. Device information sent by other paired switching devices 110 specifically refers to LLDP packets. An LLDP packet includes an identifier of the sending switching device, and an identifier of a port of the sender. Through combination with the port information of the port which received the LLDP packet, the switching device 110 which received the LLDP packet will be able to correctly ascertain physical connectivity with the switching device that is the sender of the LLDP packet. Herein, connectivity relationships ascertained through actual communication using LLDP are assumed to be correct connectivity relationships.

The connectivity information management table 210 is composed of a local connection port 211 that received the LLDP packet; a device identifier 212 of the switching device that is the sender of the LLDP packet in question (described in the LLDP packet in question); a paired port 213 constituting the port used for transmitting the LLDP packet in question, in the switching device that is the sender of the LLDP packet in question (described in the LLDP packet in question); and communication status 214 indicating whether LLDP packets can be periodically received. If LLDP packets can be periodically received from paired switching devices via connection ports, a value indicating "connected" will be recorded in the communication status 214; in other states, a value indicating "disconnected" will be recorded. For ease of understanding, in FIG. 8, the symbols of the corresponding ports (FIG. 1) are shown in parentheses next to the identifiers of the connection ports and the paired ports; and the symbols of the corresponding switching devices (FIG. 1) are shown in parentheses next to the device identifiers (these are not described in actual practice).

While the configuration of the Network System 1000 has been described hereinabove, the switching device management table 150 (FIG. 4) and the connectivity information management table 210 (FIG. 8) of the first switching device 110A used in the example discussed above indicate a condition in which the third switching device 110C is not running for some reason. Specifically, communication status with the third switching device 110C is the "disconnected" state, both with the management device 100 and with the other switching devices 110.

Figure 10:
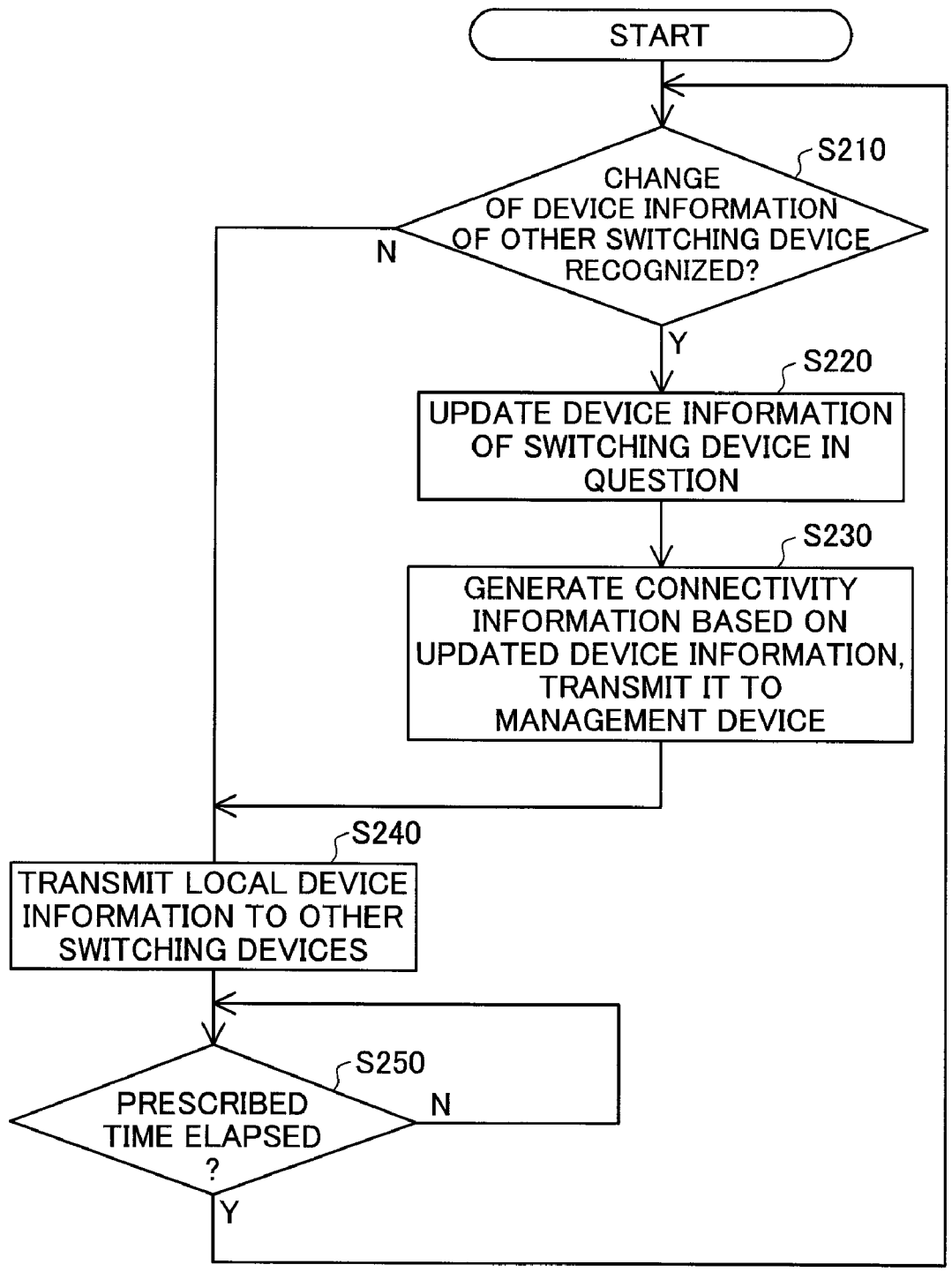
FIG. 10 is a flowchart depicting the processing routine of a process relating to connectivity information in the switching device.
Figure 11:
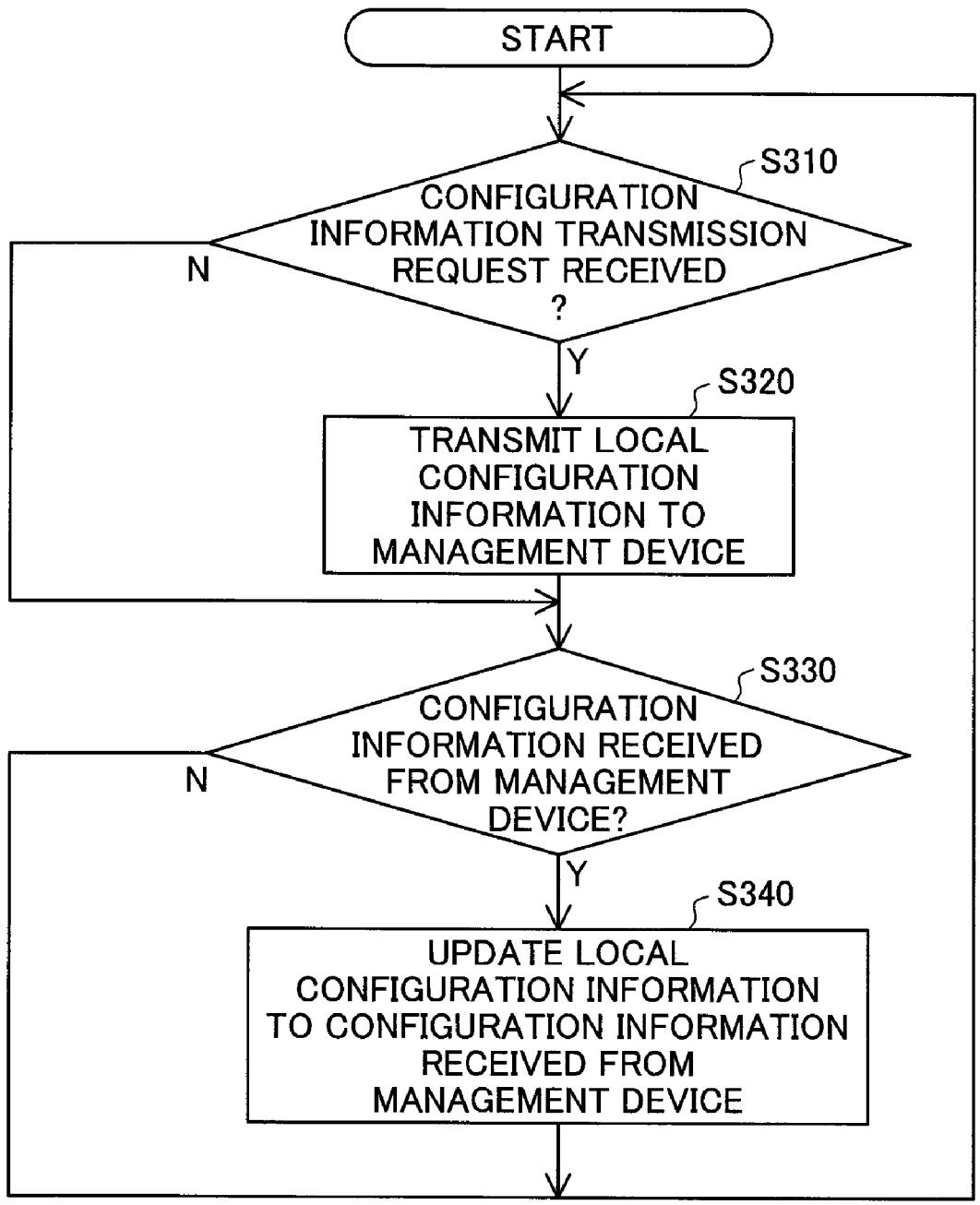
FIG. 11 is a flowchart depicting the processing routine of a process relating to configuration information in the switching device.

Operation of Network System:

a) First, operation of the switching device 10 will be described with reference to FIGS. 9 through 11. FIG. 9 is a flowchart depicting the processing routine of a process relating to live connection verification in the switching device. FIG. 10 is a flowchart depicting the processing routine of a process relating to connectivity information in the switching device. FIG. 11 is a flowchart depicting the processing routine of a process relating to configuration information in the switching device. In addition to its inherent function, i.e. the frame relay process, each switching device also performs the following processes in relation to the management device 100, or in relation to other neighboring switching devices 110.

a-1) Process Relating to Live Connection Verification

The process relating to live connection verification in switching devices will be discussed with reference to FIG. 9. The process is carried out on a constant basis during the time that the switching device 110 is running. First, the live connection verification module 144 of the switching device 110 tests setup of communication with the management device 100 (Step S110). Specifically, using a predetermined port 160 and the IP address configured for that port, the live connection verification module 144 attempts to establish a connection with the management device 100. The port 106 and IP address used will be acquired from the configuration information 160 of each switching device 110.

If the live connection verification module 144 is successful in establishing communication with the management device 100 (Step S120: YES), it will transmit a live connection verification packet describing its local identifier to the management device 100 (Step S140).

In the event that for some reason the live connection verification module 144 cannot establish communication with the management device 100 (Step S120: NO), the address acquisition module 143 will execute an address acquisition process (Step S130). Specifically, the address acquisition module 143 will transmit an IP address request requesting assignment of an IP address from any port 116, thereby acquiring an IP address assigned from an external device (e.g. the DHCP server). Requests for and distribution of IP addresses are made in accordance with DHCP protocol, for example. After the address acquisition process, the live connection verification module 144 will use the IP address assigned from the external device to re-attempt to establish communication with the management device 100 (Step S110). Attempt by the live connection verification module 144 to establish communication, and the address acquisition process by the address acquisition module 143, will be repeated until communication with the management device 100 can be established (Steps S110 to S130).

Once the live connection verification module 144 has transmitted the live connection verification packet to the management device 100, after a prescribed time interval has elapsed (Step S150: YES), it will return to Step S110 and repeat the process, thereby sending live connection verification packets to the management device 100 at periodic intervals.

a-2) Process Relating to Connectivity Information

The process relating to connectivity information in switching devices will be described with reference to FIG. 10. The process is carried out on a constant basis during the time that the switching device 110 is running. First, the connectivity information processing module 142 of the switching device 110 will decide whether there has been any change in device information for the other switching devices 110 (Step S210), and if it recognizes that a change has occurred (Step S210: YES) will update the device information for the switching device 110 in question (Step S220). Specifically, the connectivity information processing module 142 will decide, depending on the received content and reception conditions of the LLDP packet from the other switching device 110, whether there has been a change in relation to the device information which is recorded in the connectivity information management table 210 (FIG. 8). Then, if it decides that a change has occurred, the connectivity information processing module 142 will update the relevant location of the connectivity information management table 210, in regard to the device information relating to the device which is the sender of the LLDP packet. Specifically, in the event that reception of LLDP packets is interrupted for longer than a prescribed time interval, the communication status 214 in the corresponding device information will be changed from "connected" to "disconnected." Alternatively, the connection port 211, the device identifier 212, or the paired port 213 in the connectivity information management table 210 will be updated on the basis of the content described in the received LLDP packet and the local port 116 which received the LLDP packet in question.

Once the device information in the connectivity information management table 210 has been updated, the connectivity information processing module will generate connectivity information on the basis of the updated device information, and send the generated connectivity information to the management device 100 (Step S230). In the present embodiment, the connectivity information is information that includes the device information recorded in the connectivity information management table 210 (the connection port 211, the device identifier 212 of paired device, the paired port 213, and the communication status 214), plus the local device identifier. As noted, connectivity information is generated based on device information updated on the basis of the received LLDP packet. Consequently, connectivity relationships among switching devices 110 described in the connectivity information will be correct connectivity relationships representing actual physical wired connections.

If determined that there has been no change in device information of the other switching devices (Step S210: NO), or after connectivity information has been transmitted to the management device 100, the connectivity information management module 142 will proceed to Step S240.

In Step S240, the device information transmission module 141 will transmit its local device information to the other paired switching devices (Step S240). For example, the first switching device 110A would transmit device information for the first switching device 110A to the second switching device 110B and to the third switching device 110C. Specifically, the device information will be transmitted as an LLDP packet, and will include the local device identifier and the identifier of the local port used to transmit the LLDP packet.

Once the device information transmission module 141 has transmitted its local device information to the other paired switching devices, after a prescribed time interval has elapsed (Step S250: YES), it will return to Step S210 and repeat the process. By so doing, the switching device 110, through its device information transmission module 141, periodically transmits its local device information to other switching devices 110; and each time that the device information transmission module 141 has recognized a change in device information of another switching device 110, it will transmit connectivity information reflecting the change to the switching device 110.

a-3) Process Relating to Configuration Information

The process relating to configuration information in switching devices will be described with reference to FIG. 11. The process is carried out on a constant basis during the time that the switching device 110 is running. First, the configuration information control module 145 of the switching device 110 decides whether a request to transmit configuration information has been received from the management device 100 (Step S310). If a request to transmit configuration information has been received (Step S310: YES), the configuration information control module 145 will transmit the configuration information 160 stored in its local memory 114 to the management device 100 (Step S320).

Next, the configuration information control module 145 will decide whether configuration information has been received from the management device 100 (Step S330). In the event that configuration information has been received from the management device 100 (Step S330: YES), the configuration information control module 145 will update its local configuration information 160, replacing it with the configuration information received from the management device 100 (Step S340). The configuration information control module 145 repeats the above process (S310 to 340).

a-4) DHCP Module Process

Upon receiving an IP address request packet from another switching device or client computer, the DHCP module 146 of the management device 100 will assign to the device which is the sender of the IP address request packet an IP address selected from a predetermined range of IP addresses. The DHCP module 146 will then insert the IP address into an IP address distribution packet and transmit it to the device which is the sender of the IP address request packet. Specifically, these processes are carried out according to DHCP protocol; configuration relating to the DHCP protocol is described in the configuration information 160.

Figure 12:
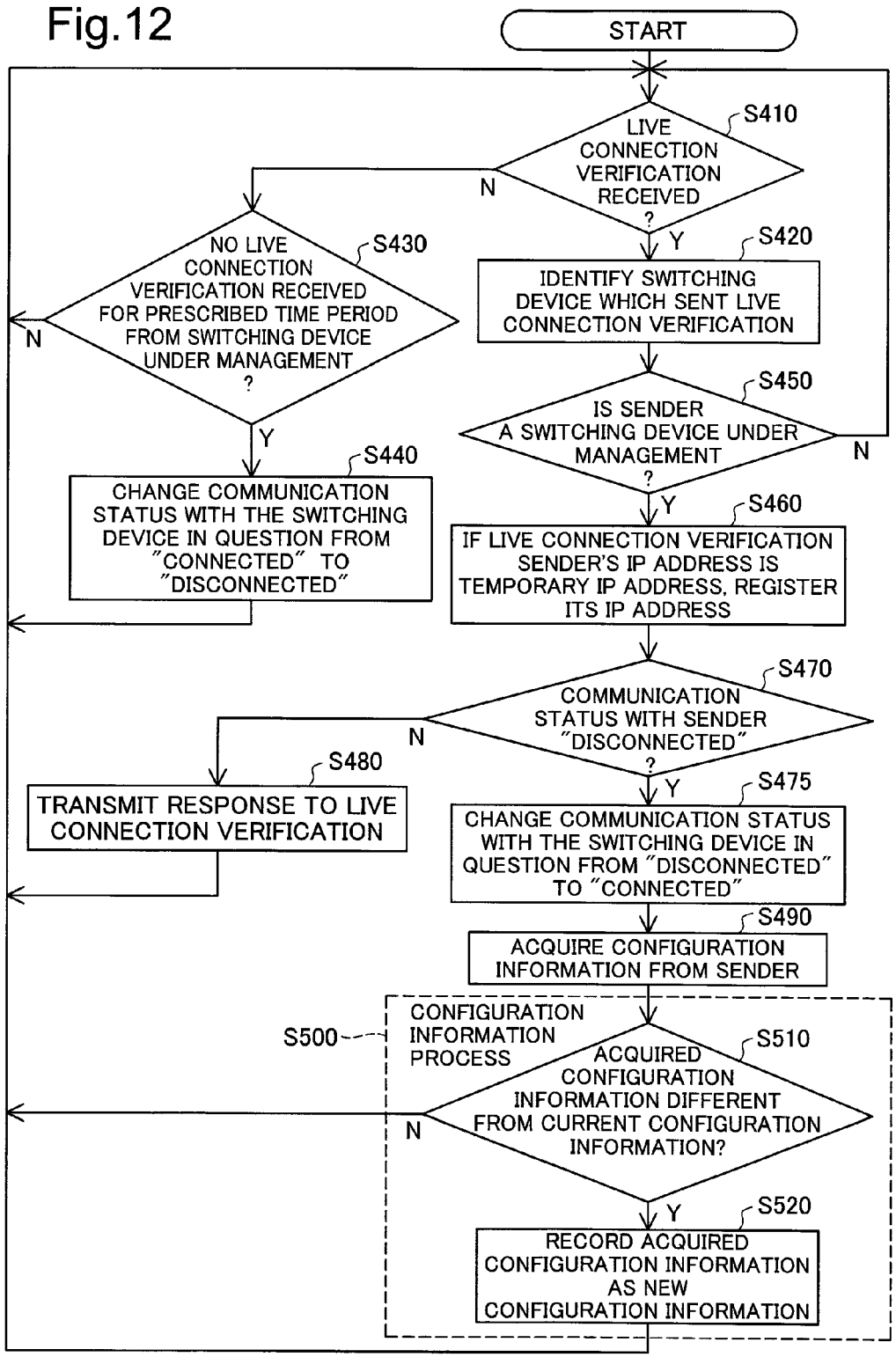
FIG. 12 is a flowchart depicting the processing routine of a process relating to live connection verification in the management device.
Figure 13:
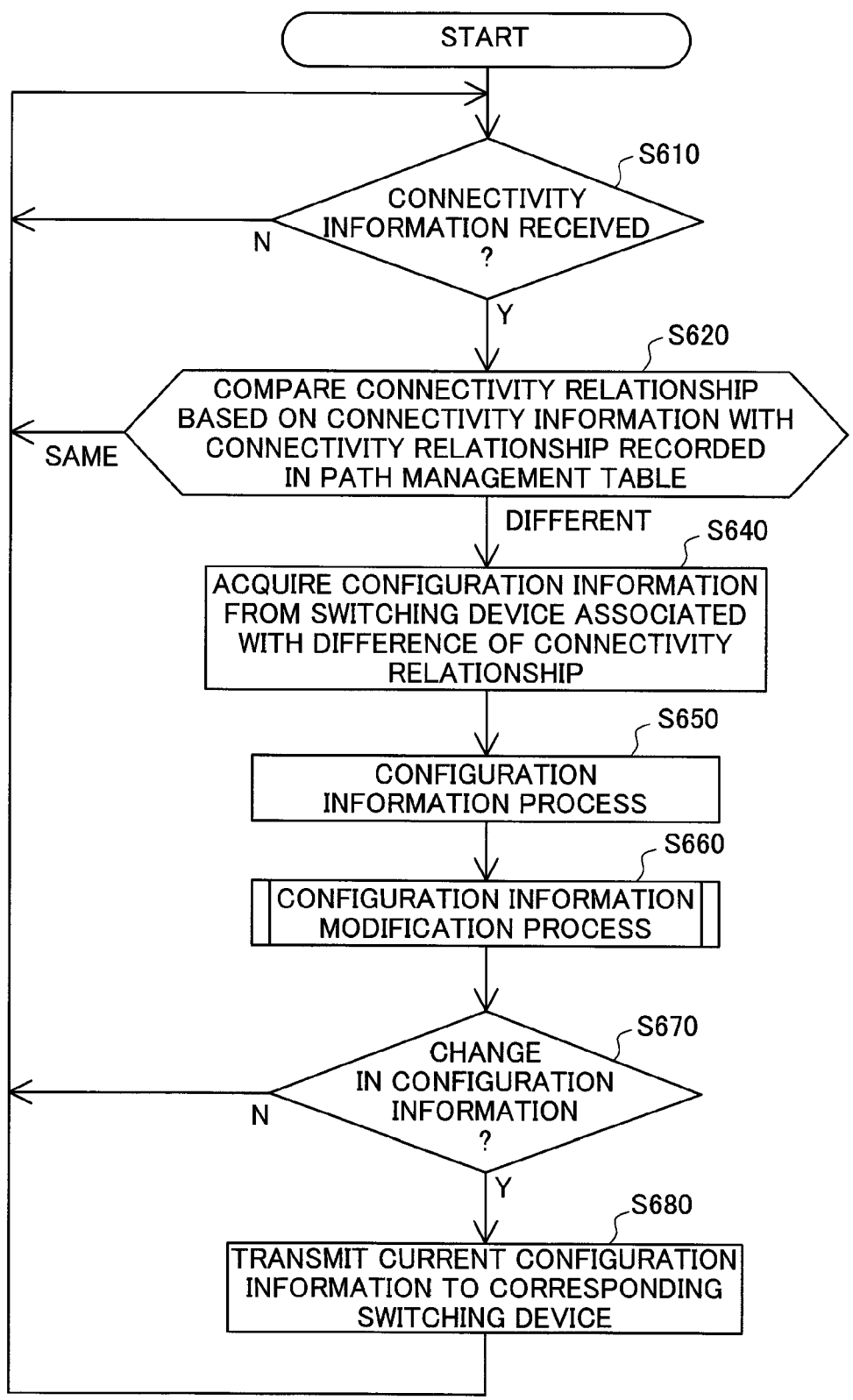
FIG. 13 is a flowchart depicting the processing routine of a process relating to connectivity information in the management device.
Figure 14:
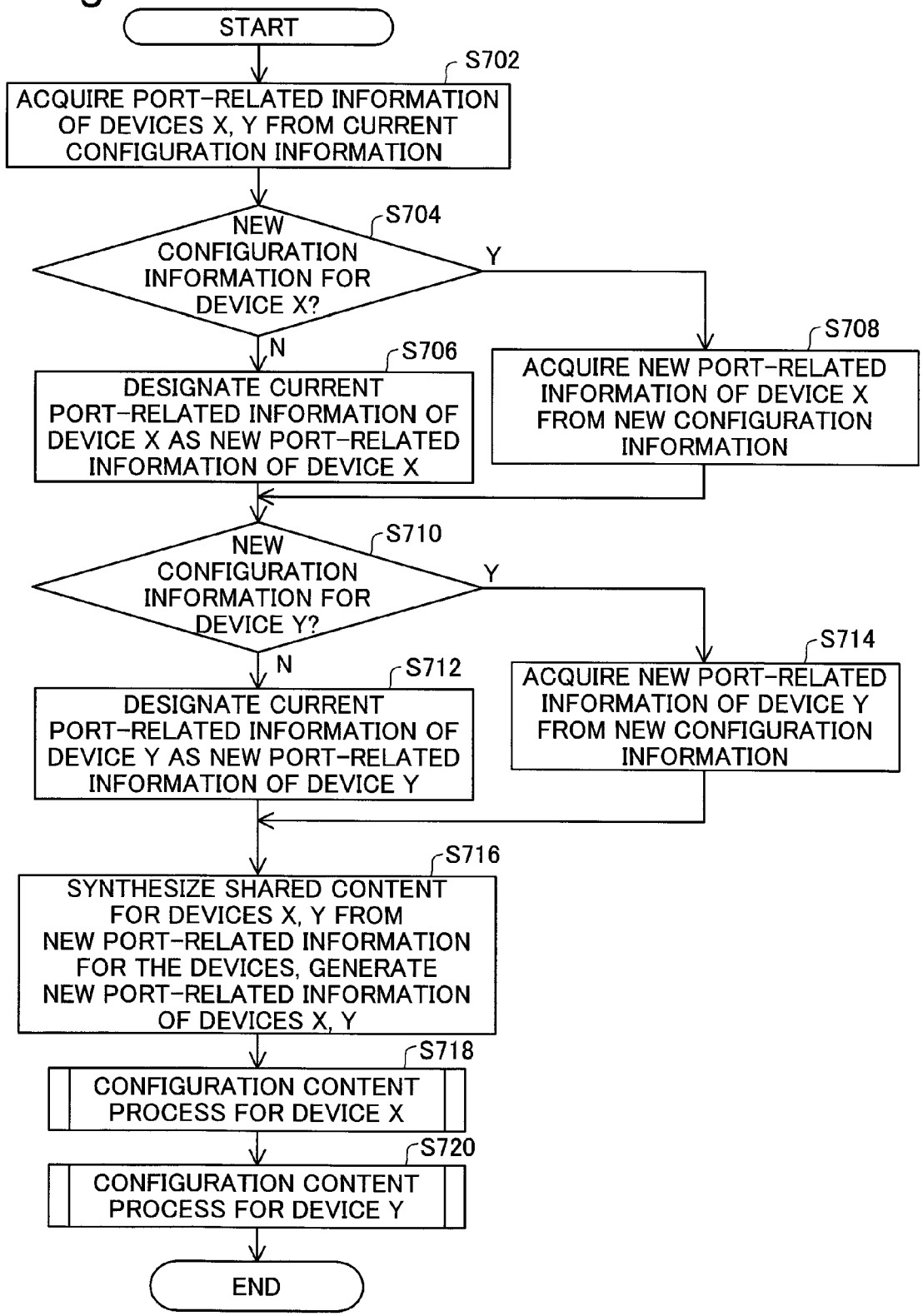
FIG. 14 is a flowchart depicting the processing routine of a process relating to a configuration information modification process in the management device.
Figure 15:
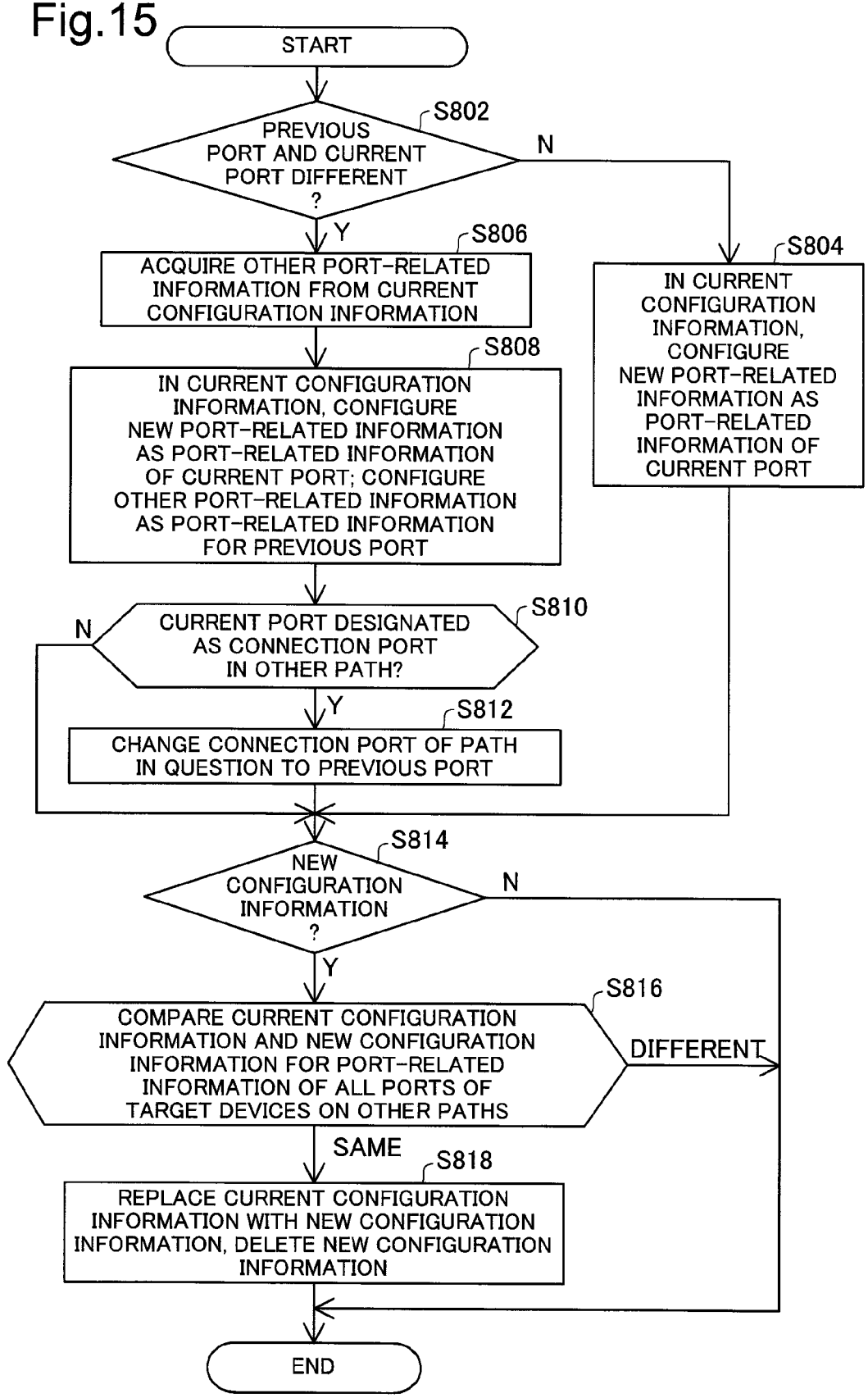
FIG. 15 is a flowchart depicting the processing routine of a process relating to a configuration content process in the management device.

Operation of the switching devices was discussed above. Here, the aforementioned process relating to live connection verification, the process relating to connectivity information, the process relating to configuration information, and the process of the DHCP module are respectively carried out independently and in parallel.

b) Operation of Management Device:

The management device 100 will be described with reference to FIGS. 12 to 15. FIG. 12 is a flowchart depicting the processing routine of a process relating to live connection verification in the management device. FIG. 13 is a flowchart depicting the processing routine of a process relating to connectivity information in the management device. FIG. 14 is a flowchart depicting the processing routine of a process relating to a configuration information modification process in the management device. FIG. 15 is a flowchart depicting the processing routine of a process relating to a configuration content process in the management device.

b-1) Process Relating to Live Connection Verification

The process relating to live connection verification in the management device 100 will be discussed with reference to FIG. 12. The process is carried out on a constant basis during the time that the switching devices 110 are running. First, the switching device identification module 121 of the management device 100 monitors for receipt of live connection verifications (Step S410), and once a live connection verification is received (Step S410: YES), identifies the sending switching device 110 (Step S450). The live connection verification includes a device identifier of the aforementioned sending switching device 110. The switching device identification module 121 compares the device identifier included in the live connection verification to the device identifiers 154 in the switching device management table 150 (FIG. 4). The switching device identification module 121 is thereby able to identify the sending switching device 110.

If as a result it is found that the sending device is not a switching device under management by the management device 100 (Step S450: NO), the switching device identification module 121 will return to Step S410. In the present embodiment, the switching devices under management by the management device 100 are the first to third switching devices 110A to 110C.

On the other hand, in the event that the sending device is a switching device under management (Step S450: YES), and if the sender's IP address included in the IP header of the live connection verification is a temporary IP address, the switching device identification module 121 will register the sender's IP address in the temporary IP address 157 field of the switching device management table 150 (FIG. 4) (Step S460). In the event that the sender's IP address matches one described in the switching device management table 150 as being the IP address 156 of the sending switching device 110 (FIG. 4), it will be determined that the sender's IP address is a temporary IP address.

Next, the switching device identification module 121 will decide whether communication status with the sending switching device 100 was "connected" or "disconnected" (Step S470). This decision is made on the basis of the description of communication status 155 of the sending switching device 110 in the switching device management table 150.

If the switching device identification module 121 decides that the communication status with the sending switching device 110 is "connected" (Step S470: NO), it will transmit to the sending switching device 110 a response to the live connection verification (Step S480), and return to Step S410. In the event that communication with the sending management device 100 is described in the switching device management table 150 as being "connected," live connection verifications periodically transmitted from the sending switching device 110 will be received and it may be assumed that communication has not been interrupted due to a failure, configuration change, or other reason. Consequently, the sending switching device 110 may be assumed to be operating without any change in configuration information 160, so a response is simply transmitted to the live connection verification.

On the other hand, if the switching device identification module 121 decides that the communication status with the sending switching device 110 was "disconnected" (Step S470: YES), it will change the description of the communication status 155 of the sending switching device 110 in the switching device management table 150 from "disconnected" to "connected" (Step S475). In the event that communication with the sending switching device 110 is described in the switching device management table 150 as being "disconnected," it is conceivable that communication with the switching device 110 was interrupted for some reason, or that there was no communication from the start. Possible reasons include circuit failure or a failure or stoppage of the sending management device 100. Since a live connection verification was received from the switching device 110, it is conceivable that previously interrupted communication was reestablished, or that initial communication was established. Thus, the description of the communication status 155 of the sending switching device 110 in the switching device management table 150 will be changed from "disconnected" to "connected."

Once the communication status 155 of the sending switching device 110 has been changed from "disconnected" to "connected," the configuration information acquisition module 123 will acquire the configuration information 160 configured in the sending switching device 110 (Step S490). Specifically, the configuration information acquisition module 123 transmits to the sending switching device 110 a request to transmit configuration information, and receives the configuration information 160 from the switching device 110 in response to the request. The reason for acquiring the configuration information 160 here is that it is possible that the configuration information may have changed in the process of reestablishing communication that was previously interrupted or that of establishing communication for the first time, for example, during recovery from a failure or during start-up of the switching device 110.

Once the configuration information 160 has been acquired, the configuration information acquisition module 123 will execute configuration information processing (Step S500). Configuration information processing includes the following Step S510 and Step S520. In Step S510, the configuration information acquisition module 123 compares the acquired configuration information 160 (acquired configuration information) with the configuration information recorded in the switching device management table 150 as the current configuration information 152 for the switching device 110 in question (current configuration information). In the event that the acquired configuration information and the current configuration information are the same (Step S510: NO), the configuration information acquisition module 123 will take no action, whereas if the acquired configuration information and the current configuration information are different (Step S510: YES), it will record the acquired configuration information as new configuration information in the new configuration information 153 field (FIG. 4) of the switching device management table 150 (Step S520). Once configuration information processing has been completed, the process returns to Step S410.

In the event that a live connection verification is not received (Step S410: NO), the switching device identification module 121 will decide whether, from among the switching devices 110A to 110C under management, there is any switching device from which the management device 100 has not received live connection verification over a prescribed time interval (Step S430). In the event that there is a switching device from which the management device 100 has not received live connection verification (Step S430: YES), the switching device identification module 121 will change the communication status with the switching device 110 in question from "connected" to "disconnected" in the switching device management table 150 (Step S440), and return to Step S410. On the other hand, in the event that there is not a switching device from which the management device 100 has not received live connection verification (Step S430: NO), the switching device identification module 121 will return to Step S410, taking no action. By so doing, in the switching device management table 150, the communication status 155 of switching devices 110 from which live connection verification is periodically received will be set to "connected" while the communication status 155 of switching devices 110 from which live connection verification has been interrupted or never received at all will be set to "disconnected."

b-2) Process Relating to Connectivity Information

The process relating to connectivity information in the management device 100 will be described with reference to FIG. 13. The process is carried out on a constant basis during the time that the switching devices 110 are running. First, the configuration information reception module 125 of the management device 100 monitors for receipt of connectivity information from any of the switching devices 110 under management (Step S610). If the configuration information reception module 125 receives connectivity information (Step S610: YES), the connectivity relationship comparison module 126 will compare the connectivity relationship based on the received connectivity information (correct connectivity relationship) with the corresponding connectivity relationship recorded in the path management table 200 (Step S620: also termed connectivity relationship comparison process). For example, let it be assumed that the connectivity relationship based on the received connectivity information is the connectivity relationship between the first switching device 110A and the second switching device 110B. In this case, the corresponding connectivity relationship will be the connectivity relationship recorded in the connectivity information management table 210, as path information for the path BB-1F between the switching device 110A and the second switching device 110B.

If as a result of the comparison, it is found that the connectivity relationship based on the received connectivity information (correct connectivity relationship) is the same as the corresponding connectivity relationship recorded in the path management table 200 (Step S620: SAME), i.e., that there is no difference between the correct connectivity relationship and the connectivity relationship recorded in the path management table 200, the process will return to Step S610 without performing any processing.

On the other hand, if as a result of the comparison, it is found that the connectivity relationship based on the received connectivity information (correct connectivity relationship) is different from the corresponding connectivity relationship recorded in the path management table 200 (Step S620: DIFFERENT), i.e., that there is a difference between the correct connectivity relationship and the connectivity relationship recorded in the path management table 200, the correct connectivity relationship will be recorded in the path management table 200, and the configuration information acquisition module 123 will acquire the configuration information 160 configured in the switching devices associated with the difference between the connectivity relationships (Step S640). Specifically, the configuration information acquisition module 123 transmits to the switching device 110 in question a request to transmit its configuration information, and in response to the request receives the configuration information 160 from the switching device 110 in question. Here, where difference in question is a difference concerning path information for the path BB-1F between the switching device 110A and the second switching device 110B, the switching devices associated with this difference between the connectivity relationships will be the first switching device 110A and the second switching device 110B. Here, it is not always necessary to acquire configuration information 160 from both the first switching device 110A and the second switching device 110B. In the present embodiment, the configuration information 160 is acquired from the switching device 110 which is not the sender of the connectivity information received in Step S610. For example, where the switching devices associated with a difference between the connectivity relationships are the first switching device 110A and the second switching device 110B and where the first switching device 110A is the sender of the connectivity information, the configuration information acquisition module 123 will acquire the configuration information 160 from the second switching device 110B.

Once the configuration information 160 is acquired, the configuration information acquisition module 123 will executed configuration information processing (Step S650). This configuration processing is identical to the configuration information processing (S500) in the process relating to live connection verification discussed earlier (FIG. 12), and need not be discussed again here. Once configuration information processing has been carried out, the configuration information modifier 122 will execute a configuration information modification process.

The configuration information modification process will be described with reference to FIG. 14. Here, the two switching devices 110 associated with the difference in connectivity relationships, i.e. the switching devices 110 at either end of the path in which the difference has arisen, will be denoted respectively as Device X and Device Y. In the initial stage of the configuration information modification process, the configuration information modifier 122 recognizes the previous connection port and current connection port on the Device X side and the previous connection port and current connection port on the Device Y side, for the path in which the difference has arisen. Previous connection port refers to a port described in the connectivity information management table 210; current connection port refers to a port recognized through receipt of connectivity information (in the present embodiment, an LLDP packet as discussed earlier).

Once the configuration information modification process has been initiated, the configuration information modifier 122 will acquire current port-related information for Device X and current port-related information for Device Y, respectively (Step S702). Current port-related information refers to port-related information for the previous connection port, described in the current configuration information stored in the switching device management table 150 (FIG. 4: 151).

Once the current port-related information has been acquired, the configuration information modifier 122 will decide whether new configuration information of Device X is stored in the switching device management table 150 (Step S704). In the event that new configuration information of Device X is not stored in the switching device management table 150 (Step S704: NO), the configuration information modifier 122 will designate the current port-related information of Device X as the new port-related information of Device X (Step S706). In the event that new configuration information of Device X is stored (Step S704: YES), the configuration information modifier 122 will acquire port-related information for the current port of Device X from the new configuration information of Device X stored in the switching device management table 150, and designate it as the new port-related information of Device X (Step S708).

Similarly, the configuration information modifier 122 will decide whether new configuration information of Device Y is stored in the switching device management table 150 (Step S710). In the event that new configuration information of Device Y is not stored (Step S710: NO), the configuration information modifier 122 will designate the current port-related information of Device Y as the new port-related information of Device Y (Step S712). In the event that new configuration information of Device Y is stored (Step S710: YES), the configuration information modifier 122 will acquire port-related information for the current port of Device Y from the new configuration information of Device Y stored in the switching device management table 150, and designate it as the new port-related information of Device Y (Step S714).

Once the new port-related information of Devices X and Y has been recognized, the configuration information modifier 122 will compare the new port-related information of Devices X and Y, and synthesize content thereof that should be shared by Devices X and Y to newly generate new port-related information for Devices X and Y (Step S712).

Next, the configuration information modifier 122 will perform a configuration content process for Device Z (Step S718), and then perform a similar configuration content process for Device Y (Step S720), whereupon the configuration information modification process terminates.

The configuration content process will be described with reference to FIG. 15. As noted, the configuration content process is a process carried out respectively for Device X and Device Y located at either end of the path in which a difference has arisen. In the description of the process herein, the path in which a difference has arisen shall be termed the target path; and the Device X or Device Y targeted for the process shall be termed the target device. Once the configuration content process for a target device has been initiated, the configuration information modifier 122 will decide whether there is a difference between previous connection port and the current connection port on the target device end of the target path (Step S802).

In the event that the previous connection port and the current connection port on the target device end of the target path are the same (Step S802: NO), the configuration information modifier 122 will configure the new port-related information of the target device as the port-related information for the current connection port (=previous connection port) in the current configuration information (FIG. 4: symbol 152) stored in relation to the target device in the switching device management table 150 (Step S804), and proceed to Step S814. The port-related information configured up to that point will be deleted.

On the other hand, in the event that the previous connection port and the current connection port on the target device end of the target path are different (Step S802: YES), the configuration information modifier 122 will acquire the port-related information of the current port of the target device from the current configuration information stored in relation to the target device in the switching device management table 150, and designate it as other port-related information (Step S806).

The configuration information modifier 122 will then configure the new port-related information of the target device as the port-related information of the current connection port in the current configuration information (FIG. 4: symbol 152) stored in relation to the target device in the switching device management table 150; as well as configuring the other port-related information of the target device as the port information of the previous connection portion (Step S808). The port-related information configured up to that point will be deleted.

Next, the configuration information modifier 122 will decide whether, of paths other than the target path described in the path management table 200 (hereinafter, such paths will be termed other paths), there is any path having as its connection port the current connection port on the target device end of a target path selected from among (Step S810). If the path in question exists (Step S810: YES), the configuration information modifier 122 will change the connection port of the path in question to the previous connection port on the target device end of a target path (Step S814) and proceed to Step S814. If the path in question does not exist (Step S810: NO), the configuration information modifier 122 will proceed to Step S814, taking no action.

In Step S814, the configuration information modifier 122 decides whether there is new configuration information (FIG. 4: symbol 153) for the target device in the switching device management table 150 (Step S814).

In the event that there is no new configuration information (Step S814: NO), the configuration information modifier 122 will terminate the configuration content process.

On the other hand, in the event that there is new configuration information (Step S814: YES), the configuration information modifier 122 will compare the current configuration information and the new configuration information for the port-related information of all connection ports of target devices on the other paths (Step S816). If through the comparison the configuration information modifier 122 finds that the current configuration information and the new configuration information are different (Step S816: DIFFERENT), it will take no action, i.e. terminate the configuration content process leaving the new configuration information unchanged.

If through the comparison the configuration information modifier 122 finds that the current configuration information and the new configuration information are the same (Step S816: SAME), it will replace the current configuration information with the new configuration information, delete the new configuration information, and terminate the configuration content process.

The discussion now continues referring back to FIG. 14. For Device X and Device Y, once the respective configuration content processes (Steps S718, S720) have terminated, the configuration information modification process will terminate.

The discussion now continues referring back to FIG. 13. Once the configuration information modification process (Step S660) has terminated, the configuration information distribution module 124 will decide, individually for Device X and Device Y, whether there has been any modification of the configuration information in the switching device management table 150 (Step S670). Here, a decision of "not modified" will be made in the event that: 1) that the previous port and the current port of the target path in the target device are the same, and that the current port-related information and the new port-related information are the same; or 2) that the current configuration information was replaced with the new configuration information in Step S818 (FIG. 15); in other instances, a decision of "modified" will be made.

In the event the configuration information has not been modified (Step S670: NO), the configuration information distribution module 124 will return to Step S610, taking no action.

If on the other hand the configuration information has been modified (Step S670: YES), the configuration information distribution module 124 will transmit (distribute) the current configuration information (FIG. 4: symbol 152) stored in the switching device management table 150 to the corresponding switching device 110 (Step S680) and return to Step S610. As a result, current configuration information that was modified in the configuration information modification process (Step S660) will be configured as the configuration information 160 in the corresponding switching device 110. Here, transmission of current configuration information may be made to all switching devices determined to have "modified" configuration information; or made only to certain switching devices which, of the switching devices determined to have "modified" configuration information, do not have associated new configuration information stored in the switching device management table 150. Where new configuration information is stored in the switching device management table 150, it is possible that distributed current configuration information may be deficient, so the present embodiment employs the latter approach.

c) Specific Embodiments of System Operation:

c-1) Specific Embodiment 1

Figure 16:
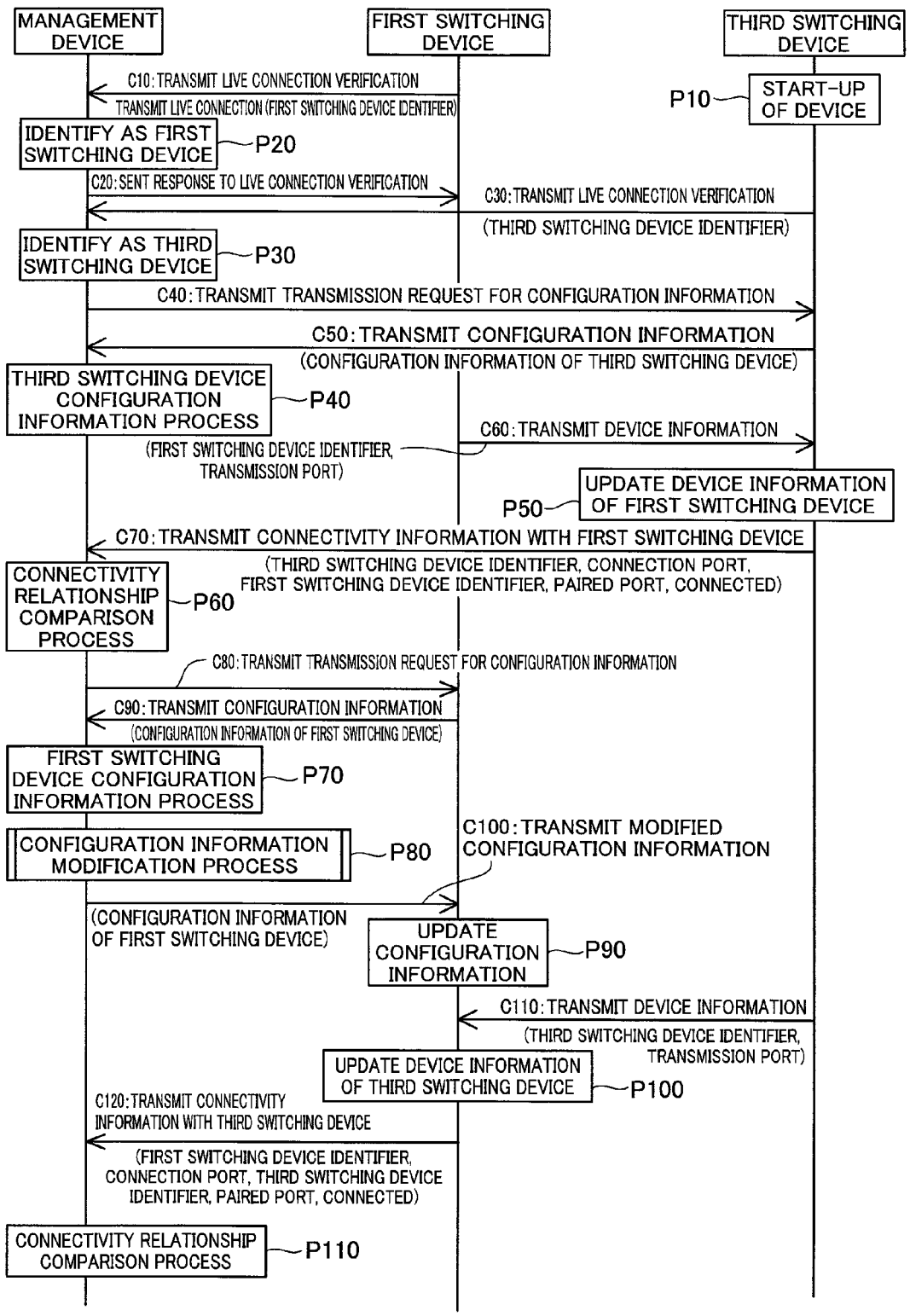
FIG. 16 is a sequence diagram showing the processing sequence of the Network System in Specific Embodiment 1.

One specific embodiment of operation of the Network System 1000 discussed above will be described with reference to FIGS. 16 through 20. This specific embodiment shall describe processes taking place from a state in which the first switching device 110A is operating normally and the third switching device 110C is stopped, to a state in which the third switching device 110C is booted up and becomes operational. FIG. 16 is a sequence diagram showing the processing sequence of the Network System in Specific Embodiment 1. FIG. 17 is an illustration depicting an example of configuration information that is configured in the third switching device when the third switching device is booted up in Specific Embodiment 1. In FIG. 17, an example of the port-related information in the configuration information 160 of the third switching device 110C is shown. FIG. 18 is an illustration depicting an example of configuration information that is configured in the first switching device after the configuration information modification process in Specific Embodiment 1. In FIG. 18, an example of the port-related information in the configuration information 160 of the first switching device 110A is shown. FIG. 19 is an illustration depicting the switching device management table after the configuration information modification process in Specific Embodiment 1. FIG. 20 is an illustration depicting the path management table after the configuration information modification process in Specific Embodiment 1. In FIG. 16, symbols prefixed by "C" (e.g. C10, C20) represent exchange of information among devices, and symbols prefixed by "P" (e.g. C10, C20) represent processes carried out in individual devices.

In this specific embodiment, the third switching device 110C is assumed to be in condition in which communication is enabled with the management device 100 via the first switching device 110A. Prior to boot-up of the third switching device 110C, the port-related information shown in FIG. 5 is configured in the current configuration information CONF_A1 of the first switching device 110A being managed by the management device 100. Similarly, prior to boot-up of the third switching device 110C, the port-related information shown in FIG. 6 is configured in the current configuration information CONF_C1 of the third switching device 110C being managed by the management device 100.

Furthermore, prior to boot-up (i.e. during stoppage) of the third switching device 110C, the third switching device 110C will be in a state of "disconnected" communication vis-à-vis the management device 100 and the other switching devices 110. Consequently, prior to boot-up of the third switching device 110C, the switching device management table 150 of the management device 100 will be in the state shown in FIG. 4, and the connectivity information management table 210 of the first switching device 110A will be in the state shown in FIG. 8.

In the operational state, the first switching device 110A will periodically transmit live connection verification as described previously, for the purpose of verifying that there is no problem in communicating with the management device 100 (FIG. 16: C10; FIG. 9: S140). From the identifier included in the live connection verification the management device 100 will be able identify the sender of the live connection verification as being the first switching device 110A under its management (FIG. 16: P20; FIG. 12: S420). Since "connected" communication status 155 is indicated in the switching device management table 150 for the first switching device 110A (FIG. 4), the management device 100 will transmit a response to the live connection verification (FIG. 16: C20; FIG. 12: S480), but will not make any modification to the switching device management table 150.

When the third switching device 110C is booted up, the control program 140 is loaded into the memory 114 from an external storage device, internal hard disk, or other storage medium (not illustrated) in the third switching device 110C, and the operations of the modules 141 to 146 will be initiated (FIG. 16: P10).

The third switching device 110C will test setup of communication with the management device 100 (FIG. 9: S110), and if successful will transmit live connection verification to the management device 100 (FIG. 16: C30; FIG. 9: S140). From the identifier included in the live connection verification the management device 100 will be able identify the sender of the live connection verification as being the third switching device 110C under its management (FIG. 16: P20; FIG. 12: S420). Since "disconnected" communication status 155 is indicated in the switching device management table 150 for the third switching device 110C (FIG. 4), the management device 100, having changed the communication status 166 to "connected" (FIG. 12: S475), will then acquire the configuration information 160 from the third switching device 110C (FIG. 16: C40, C50; FIG. 12: S490).

Having acquired the configuration information 160 from the third switching device 110C, the management device 100 will now execute configuration information processing of the third switching device 110C (FIG. 16: P40; FIG. 12: S500). Specifically, the acquired configuration information will be compared with current configuration information 152 of the third switching device 110C being managed by the switching device management table 150, and if they are the same, no action will be taken; however, if they are different the acquired configuration information 160 will be recorded in the new configuration information 153. In this specific embodiment, the port-related information (FIG. 6) of the current configuration information 152 of the third switching device 110C stored in the switching device management table 150, and the port-related information (FIG. 17) of the configuration information 160 actually configured in the third switching device 110C (i.e. the configuration information acquired in C50) are different, and therefore the configuration information acquired in C50 will be recorded as the new configuration information 153 in the switching device management table 150 (CONF_C2 will be the recorded configuration information).

Since the first switching device 110A is in the operational state, it will periodically transmit device information to other switching devices 110 as mentioned previously (FIG. 10: S240). When the third switching device 110C receives device information transmitted from the first switching device 110A after boot-up (FIG. 16: C60), it will update the device information of the first switching device 110A in its local connectivity information management table 210, on the basis of the received device information of the first switching device 110A (FIG. 16: P50; FIG. 10: S220). Specifically, the third switching device 110C will record the local port which received the device information from the first switching device 110A in the connection port 211, record the identifier of the first switching device 110A in the device identifier 212, and record the transmitting port of the first switching device 110A in the paired port 213, as well as changing the value of the communication status 214 to "connected."

Once the third switching device 110C has updated the device information of the first switching device 110A, it will then transmit to the management device 100 connectivity information which describes the connectivity relationship with the first switching device 110A (FIG. 16: C70: FIG. 10: S320). The connectivity information transmitted here will describe the identifier of the third switching device 110C, together with the connection port 211 with the first switching device 110A, the device identifier 212 of the first switching device 110A, the paired port 213 of the first switching device 110A, and the communication status 214 (indicating a value of "connected") which are recorded in its connectivity information management table 210.

When the management device 100 receives the connectivity information from the third switching device 110C, it will carry out a connectivity relationship comparison process (FIG. 16: P60; FIG. 13: S620). In this specific embodiment, for the path BB-2F between the third switching device 110C and the first switching device 110A (FIG. 3), the connectivity relationship described in the path management table 200 is compared with the connectivity relationship described in the connectivity information received from the third switching device 110C to determine if they are the same. In the present specific embodiment, on the path BB-2F, the connection port on the first switching device 110A end described in the path management table 200 is 0/10 (FIG. 3), whereas the connection port on the first switching device 110A end described in the connectivity information is 0/11. In this case, since the connection port described in the path management table 200 is different (a difference has arisen) from the connectivity relationship described in the connectivity information that was received from the third switching device 110C, the management device 100 will acquire the configuration information 160 from the first switching device 110A (FIG. 16: C80, C90; FIG. 12: S640). Once the management device 100 has acquired the configuration information 160 from the first switching device 110A, it will execute configuration information processing of the first switching device 110A (FIG. 16: P70; FIG. 12: S650) in the same manner as with the configuration information processing of the third switching device 110C (FIG. 16: P40; FIG. 12: S500).

In this specific embodiment, it is assumed that the current configuration information 152 being managed in the switching device management table 150 is identical to the configuration information 160 that is actually configured in the first switching device 110A (the configuration information acquired in C90). In this case, no action will be taken, that is, nothing will be stored in the first switching device 110A new configuration information 153 field in the switching device management table 150.

Next, the management device 100, designating the first switching device 110A and the third switching device 110C at either end of the path BB-2F on which the difference has arise as Device X and Device Y respectively, will execute the configuration information modification process described previously with reference to FIGS. 14 and 15 (FIG. 16: P80).

In the configuration information modification process, the current port-related information of the first switching device 110A is designated as content relating to port 0/10 described in the current configuration information CONF_A1 (see FIG. 5); and the current port-related information of the third switching device 110C is designated as content relating to port 0/1 described in the current configuration information CONF_C1 (see FIG. 6) (FIG. 14: S702).

At this point in time, only new configuration information CONF_C2 of the third switching device 110C is saved in the switching device management table 150. Thus, the new port-related information of the third switching device 110C will be designated as information relating to the port 0/1 of the new configuration information CONF_C2; and the new port-related information of the first switching device 110A will be designated as content relating to port 0/10 (i.e. current port-related information) described in the current configuration information CONF_A1 (FIG. 14: S704 to S714).

Here, in the port-related information shown in FIG. 5, the new port-related information of the first switching device 110A is the content relating to the port 0/1, specifically, in the present embodiment, the configuration of the port 0/10, and the content of the virtual local area network (VLAN) configured for the port 0/10 (the content of vlan_id 20, 100). Specifically, it is:

```
vlan Market_div {
   vlan_id 20
   ip 10.1.20.1/24
}
vlan Managed {
   vlan_id 100
   ip 192.168.0.2/24
}
port 0/10 {
   description"BB-2F"
   tagged vlan 20,100
}
```

Meanwhile, in the port-related information shown in FIG. 17, the new port-related information of the third switching device 110C is the content relating to the port 0/1, specifically, in the present embodiment, the configuration of the port 0/1, and the content of the virtual local area network (VLAN) configured for the port 0/1 (the content of vlan_id 20, 100, 200). Specifically, it is:

```
vlan Market_div {
   vlan_id 20
}
vlan Managed {
   vlan_id 100
   ip 192.168.0.4/24
}
vlan Test {
   vlan_id 200
   ip 20.0.0.4/24
}
port 0/1 {
   description"BB-2F"
   tagged vlan 20,100,200
}
```

Of the above information, the content that should be shared by both devices 110A, 110C is synthesized to generate final new port-related information for the devices 110A, 110C (FIG. 14: S714).

The content that should be shared is the VLAN configured for either of the two ports 0/1, 0/10, and content relating to that VLAN. Specifically, it is the TestVLAN segment. However, VLAN IP addresses are configured on an individual device basis, and does not include any content that should be shared. Consequently, the new port-related information of the first switching device 110A generated by synthesis is as follows.

```
vlan Market_div {
   vlan_id 20
   ip 10.1.20.1/24
}
vlan Managed {
   vlan_id 100
   ip 192.168.0.2/24
}
vlan Test {
   vlan_id 200
}
port0/10 {
   description"BB-2F"
   tagged vlan 20,100,200
}
```

On the other hand, the new port-related information of the third switching device 110C is unchanged from the content described previously.

Furthermore, in the configuration content process for the first switching device 110A (FIG. 5), since the previous connection port, namely the port 0/10, and the current connection port, namely port 0/11, are different, the port-related information for the current connection port, namely port 0/11, will be acquired as the other port-related information (FIG. 15: S806). The other port-related information of the first switching device 110A is as follows.

```
vlan Market_div {
   vlan_id 20
   ip 10.1.20.1/24
}
vlan Managed {
   vlan_id 100
   ip 192.168.0.2/24
}
port0/11 {
   tagged vlan 20,100
}
```

In the current configuration information CONF_A1 of the first switching device 110A in the switching device management table 150, the new port-related information of the first switching device 110A will be configured as the port-related information of the current connection port, namely port 0/11; and the other port-related information of the first switching device 110A will be configured as the port-related information of the previous connection port, namely the port 0/10 (FIG. 15: S808). As a result, the current configuration information CONF_A1 of the first switching device 110A in the switching device management table 150 will be changed from the content shown in FIG. 5 to the content shown in FIG. 18. The current configuration information of the first switching device 110A subsequent to this change is denoted as CONF_A2.

On the other hand, in the configuration content process for the third switching device 110C (FIG. 15), since the previous connection port, namely the port 0/1, and the current connection port, namely the port 0/1, are the same, the new port-related information of the third switching device 110C will be configured as the port-related information of the current connection port, namely the port 0/1, in the current configuration information CONF_C1 of the third switching device 110C in the switching device management table 150 (FIG. 15: S804). As a result, the current configuration information CONF_C1 of the third switching device 110C in the switching device management table 150 will be changed from the content shown in FIG. 6 to the content shown in FIG. 17. Specifically, the current configuration information CONF_C1 of the third switching device 110C in the switching device management table 150 will now have the same content as the new configuration information CONF_C2 of the third switching device 110C As a result, the current configuration information CONF_C1 will be replaced by the new configuration information CONF_C2 in the switching device management table 150, and the new configuration information 153 field will be deleted, leaving the field blank (FIG. 15: S818).

Through the processes described up to this point, in the management device 100, the path management table 200 will be modified from the content shown in FIG. 3 to the content shown in FIG. 20, while the switching device management table 150 will be modified from the content shown in FIG. 4 to the content shown in FIG. 19.

The discussion now refers back to FIG. 16. Once the configuration information modification process (P80) has terminated, since the configuration information of the first switching device 110A has been modified, the management device 100 will transmit the modified current configuration information CONF_A2 in the switching device management table 150 to the first switching device 110A (FIG. 16: C100; FIG. 13: S680). The first switching device 110A having received the current configuration information CONF_A2 will then configure the current configuration information CONF_A2 as its local configuration information 160 (FIG. 16: P90; FIG. 11: S340).

Subsequently, in the same manner as the first switching device 110A, the third switching device 110C transmits its local device information to the other switching devices 110 (FIG. 10: S240). When the first switching device 110A receives the device information transmitted from the third switching device 110C (FIG. 16: C110), it will update the device information of the third switching device 110C in its local connection information management table 210 on the basis of the device information received from the third switching device 110C (FIG. 16: P100; FIG. 10: S220). Specifically, the first switching device 110A will record its local port which received the device information from the third switching device 110C as the connection port 211 and record the identifier of the third switching device 110C as the device identifier 212, as well as updating the communication status 214 to a value indicating "connected."

When the first switching device 110A updates the device information of the third switching device 110C, it will transmit to the management device 100 connectivity information describing the connectivity relationship with the third switching device 110C (FIG. 16: C120; FIG. 10: S230). Once the management device 100 has received the connectivity information from the first switching device 11A, it will carry out a connectivity relationship comparison process (FIG. 16: P110; FIG. 13: S620). For the path BB-2F between the third switching device 110C and the first switching device 110A, since the connectivity relationship described in the path management table 200 and the connectivity relationship described in the connectivity information received from the first switching device 110A are the same, the management device 100 will take no action.

According to Specific Embodiment 1 discussed above, the management device 100 acquires connectivity information indicating the current correct connectivity relationship, as well as appropriately acquiring the configuration information 160 current configured in the switching devices 110. Furthermore, the management device 100 corrects discrepancies of the configuration information 160 among the switching devices 110, in response to differences between newly acquired, correct connectivity relationships and connectivity relationships that have been recorded in the switching device management table 150. As a result, it will be possible to maintain communication throughout the entire network in the event that, for example, there has been a change to the actual physical lines, such as when a switching device 110 was temporarily in a state of disconnected communication but has subsequently recovered to a state of established communication.

c-2) Specific Embodiment 2

One specific embodiment of operation of the Network System 1000 discussed above will be described with reference to FIG. 21. This specific embodiment shall describe the processes in the event that for some reason the third switching device 110C has stopped. FIG. 21 is a sequence diagram depicting the Network System in Specific Embodiment 2.

Once the third switching device 110C stops (P10), the third switching device 110C will no longer be able to transmit verification of live communication to the management device 100, and will no longer be able to transmit verification of live communication to the other switching devices 110.

Once the verification of live communication that was periodically transmitted from the third switching device 110C has ceased (FIG. 21: C10), the management device 100 will detect this (FIG. 12: S430: YES), and will change the value of the communication status 155 with the third switching device 110C in the switching device management table 150 from "connected" to "disconnected" (FIG. 21: P20; FIG. 12: S440).

Meanwhile, once the verification of live communication that was periodically transmitted from the third switching device 110C has ceased (FIG. 21: C20), the first switching device 110A will detect this (FIG. 10: S210: YES), and will update the device information the third switching device 110C in its local connectivity information management table 210 (FIG. 21: P30; FIG. 10: S220). Specifically, the first switching device 110A will change the communication status 214 with the third switching device 110C in the connectivity information management table 210 from "connected" to "disconnected."

Once the connectivity information management table 210 has been updated, the first switching device 110A will transmit to the management device 100 connectivity information on the basis of the updated device information (FIG. 21: C30, FIG. 10: S230). In the connectivity information there is described the device identifier of the first switching device 110A; as well as the connection port 211 of the first switching device 110A, the device identifier 212 of the third switching device 110C, the paired port 213 of the third switching device 110C, and the communication status 214 ("disconnected") which are described in the connectivity information management table 210.

Once the management device 100 has received the connectivity information from the first switching device 110A, it will execute the connectivity relationship comparison process described previously (FIG. 21: P40; FIG. 13: S620). As a result of the comparison, it will be found that the connectivity relationship described in the connectivity information received from the first switching device 110A matches the connectivity relationship described in the connectivity information management table 210, so no action will be taken. Even if the third switching device 110C has stopped, it will be necessary to manage the current configuration information, and therefore the management device 100 will leave unchanged the current configuration information CONF_C1 of the third switching device 110C described in the switching device management table 150. As a result, in the event that, for example, the third switching device 110C has recovered, the current configuration information CONF_C1 can be used when the process shown in the aforementioned FIG. 16 is carried out.

c-3) Specific Embodiment 3

One specific embodiment of operation of the Network System 1000 discussed above will be described with reference to FIG. 22. This specific embodiment shall describe the processes in the event that, despite the third switching device 110C having been booted up, it cannot communicate with the management device 100 for some reason. FIG. 22 is a sequence diagram depicting the Network System in Specific Embodiment 3.

If a communication failure has occurred so that communication is not possible between the third switching device 110C and the management device 100 (FIG. 22: P10, PL20), communication can no longer be established between the third switching device 110C and the management device 100, and verification of live connection can no longer be transmitted to the management device 100.

Once the verification of live communication that was periodically transmitted from the third switching device 110C has ceased (FIG. 22: C10), the management device 100 will detect this (FIG. 12: S430: YES), and will change the value of the communication status 155 with the third switching device 110C in the switching device management table 150 from "connected" to "disconnected" (FIG. 22 P30; FIG. 12: S440).

Since a response from the management device 100 does not arrive, the third switching device 110C will decide that communication with the management device 100 cannot be established using the current IP address (FIG. 9: S120: NO), and will execute an address acquisition process to acquire another IP address for the purpose of establishing communication with the management device 100 (FIG. 22: P40, C30, C40). Specifically, the third switching device 110C will transmit an IP address request packet from any port 116 (FIG. 22: C30). As noted, since the first switching device 110A has DHCP server functionality (the DHCP module 146), upon receiving the IP address request packet, it will assign an IP address to the third switching device 110C (FIG. 22: P50). The first switching device 110A will then transmit to the third switching device 110C an IP address distribution packet describing the assigned IP address (FIG. 22: C40). The third switching device 110C will then configure the distributed IP address to the port which received the IP address distribution packet (FIG. 22: P60) and again test establishment of communication with the management device 100 (FIG. 9: S110). If the third switching device 110C cannot establish communication even now, it will continue the IP address acquisition process. Once communication with the management device 100, has been successfully established, the third switching device 110 will transmit live connection verification to the management device 100 (FIG. 22: C50).

On the basis of the identifier contained in the live connection verification, the management device 100 will identify the sender of the live connection verification as being the third switching device 110C under management (FIG. 22: P70, FIG. 12: S420). Since the IP address 156 (FIG. 5) of the third switching device 110C being managed in the switching device management table 150 differs from the sender's IP address of the live connection verification, the sender's IP address of the live connection verification (the current IP address of the third switching device 110C) will be determined to be a temporary IP address, and will be recorded in the temporary IP address 157 field of the switching device management table 150 (FIG. 22: P80).

Subsequent processes are the same as the processes beginning with C40 in the process during boot up of the third switching device 110C discussed earlier with reference to FIG. 16. Specifically, as shown in FIG. 16, the management device 100 will execute in order the processes shown in FIG. 16, namely, of acquiring the configuration information 160 from the third switching device 110C (FIG. 16: C40, C50), and carrying out the configuration information process of the third switching device 110C (FIG. 16: P40).

According to Specific Embodiment 3 discussed above, even in the event of a communication problem with the management device 100 has occurred, the third switching device 110C will ensure communication with the management device 100 by the address acquisition process. If communication between the management device 100 and the switching devices 110 is assured, in the same manner as in Specific Embodiment 1, the management device 100 will be able to acquire connectivity information indicating current correct connectivity relationships, as well as to appropriately acquire the configuration information 160 currently configured in each of the switching devices 110. The management device 100 can then management device 100 correct discrepancies of the configuration information 160 among the switching devices 110, in response to differences between newly acquired, correct connectivity relationships and connectivity relationships that have been recorded in the switching device management table 150. As a result, it will be possible to maintain communication throughout the entire network in the event that, for example, there has been a change to the actual physical lines, such as when a switching device 110 was temporarily in a state of disconnected communication but has subsequently recovered to a state of established communication.

The switching device address acquisition process, which is carried out for the purpose of recovering from disconnected communication with the management device 100, is a temporary measure and cannot be considered as reliable means for correcting configuration information of switching devices and ensuring communication accessibility. Accordingly, in order to reliably ensure communication accessibility in the event of that a situation such as that of FIG. 22 is encountered, it will be desirable for the administrator to carry out the appropriate configuration and wiring.

According to the present embodiment illustrated through the preceding specific embodiments, the configuration information 160 of one or a plurality of switching devices 110 making up a network, and the connectivity relationships among the switching devices, are managed in the management device 100, for example. If the configuration information 160 or physical wiring is modified during a time that communication accessibility among switching devices 110 has been lost, it will be possible nevertheless to maintain communication accessibility by modifying/correcting the configuration information 160 of each switching device 110 to reflect current connectivity relationships, through: 1. acquisition of the configuration information of each switching device 110 by the management device 100; 2. exchange of device information for local devices among switching devices 110 to verify correct connectivity relationships; and 3. acquisition of correct connectivity relationships from the switching devices 110 by the management device 100.

B. Modifications

Modification 1:

While the preceding embodiment described an example of the use of "port" definitions and "VLAN" definitions as port-related information included in the configuration information 160 configured in the switching devices 110, the content of the port-related information is not limited to this. Port-related information could also include definitions such as, for example, "redundant circuit configuration (a technology for bundling several ports so that they appear as a single logical port)"; "IP address": or "redundant configuration (a technology for using two identically configured devices or ports, and maintaining one in standby)." Moreover, regardless of whether the configuration information 160 is port-related information or not, it may include definitions representing "routing information," "routing exchange information," or "device environment information (device name, IP address distribution configuration, etc.)."

Modification 2:

In the preceding embodiment, periodic exchange of mutual device information using LLDP protocol was employed as the method for recognizing correct connectivity relationships with paired switching devices in each switching device 110, but the method is not limited to this. For example, device information could be exchanged using a proprietary protocol in place of a standardized protocol such as the LLDP protocol. Moreover, device information could be exchanged upon recognition of a change in local device information, rather than device information being exchanged on a periodic basis. In this case, changes in local device information could be recognized through detection by a sensor or the like of a change in physical wiring, for example, plugging or unplugging of a physical line to a port. Changes in device information (indicating correct connectivity relationships) recognized in switching devices 110 may be detected by the management device 100 using any of various methods, and is not limited to the method illustrated in the embodiment. For example, the management device 100 could periodically poll the switching devices 110 with regard to their device information; or the switching devices 110 could spontaneously and periodically transmit their device information to other switching devices 110. However, by having switching devices 110 spontaneously transmit device information when the device information has changed, such as taught in the embodiment, it is possible to minimize unnecessary waste of network bandwidth and load on the management device 100.

Modification 3:

In the preceding embodiment, serial numbers such as "00 : 00 : 00 : 00 : 02" are used as device identifiers; however, IP address, device name, or the like could be used instead.

Modification 4:

In the preceding embodiment, each switching device 110 is equipped with a DHCP module 146 for distributing IP addresses, but this arrangement is not limiting. For example, it would be possible to instead provide DHCP modules 146 to only some of the switching devices 110. The Network System 1000 could also be configured with a DHCP server computer separate from the switching devices 110.

Modification 5:

In the preceding embodiment, the management device 100 is a separate device from the switching devices 110; however, an arrangement in which the functions of the management device 100 are provided to some or all of the switching devices 110 in the Network System would be possible as well. The configuration of the Network System 1000 can be simplified thereby.

Modification 6:

In the preceding embodiment, the functions of the modules 141 through 146 of the switching devices 110, and the functions of the modules 121 through 126 of the management device 100, are accomplished through execution of software (programs) by the CPU 113, but this arrangement is not limiting. For example, these functions could instead be accomplished through hardware processes using ASIC (Application Specific Integrated Circuits) or FPGA (Field Programmable Gate Array) designed to accomplish the functions in question.

Modification 7:

While the preceding embodiment described an example of three interconnected switching devices 110, the number of switching devices 110 included in the Network System can be changed to any number, and the connection mode of the switching devices 110 can be modified in any way. For example, four switching devices 110 could be connected in a linear configuration, in a ring configuration, or in a star configuration.

Other Modifications

Each switching device 110 may be a layer 3 switch or router for performing layer 3 transfer, or may be a layer 2 switch for performing layer 2 transfer.

Part of the functions actualized by the hardware structure in the above embodiment may be attained by the software configuration. On the contrary, part of the functions attained by the software configuration in the above embodiment may be actualized by the hardware structure.

While the present invention have been shown and described on the basis of the embodiment and variations, the embodiment and variations described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A network management apparatus for managing a plurality of switching devices that relay data through a data communication network, the network management apparatus comprising:
 a configuration information storage that stores first configuration information, wherein the first configuration information is configured in the switching devices and includes information to be determined in accordance with connectivity relationships among the switching devices;
 a connectivity relationship detector that detects changes of connectivity relationships among the switching devices; and
 a configuration information modifier that dynamically modifies the first configuration information in accordance with detected changes of connectivity relationships;
 wherein
 the configuration information includes information set for each of the switching devices;
 the configuration information modifier, in response to detecting a change of the connectivity relationship, acquires the configuration information from the switching device engaging the change, and modifies the first configuration information based on the acquired configuration information;

the configuration information includes information defining a setting used to make a routing decision based on a direction of a data communication; and wherein the connectivity relationship detector includes:

a path information storage for managing path information which includes connectivity relationships among the switching devices;

a connectivity information receiver that receives connectivity information from one of the switching devices, wherein the connectivity information indicates connectivity relationships between another one of the switching devices and the one of the switching devices;

a connectivity relationship comparator that acquires differences between connectivity relationships among the switching devices based on the received connectivity information, and connectivity relationships among the switching devices which have been recorded in the path information; and wherein the configuration information modifier modifies the first configuration information in accordance with the acquired differences;

a configuration information acquirer that acquires second configuration information from one of the switching devices, wherein the second configuration information is currently configured in the one of the switching devices;

wherein the configuration information modifier, referring to the second configuration information, modifies the first configuration information;

when a change of the connectivity relationship is detected, the configuration information acquirer acquires the second configuration information from a switching device, among the switching devices, associated with the detected change of the connectivity relationship;

a configuration information distributor that, in the event that the first configuration information has been modified by the configuration information modifier, distributes the modified first configuration information to a switching device, among the switching devices, corresponding to the modification; and when a difference of a connectivity relationship as to a switching device with which the network management apparatus has established the communication is detected, the configuration information modifier modifies a connectivity relationship recorded in the path information as to the switching device with which the network management apparatus has established the communication so that the connectivity relationship accords with the received connectivity information.

2. A network management apparatus according to claim 1, wherein when the network management apparatus has established initial communication or previous interrupted communication with any of the switching devices, the configuration information acquirer acquires the second configuration information from a switching device, among the switching devices, with which the network management apparatus has established the communication.

3. A network management apparatus according to claim 1, wherein the network management apparatus stores identifiers that identify each of the switching devices, the network management apparatus further comprising:

a switching device identification module that, in the event that the network management apparatus has established communication with any of the switching devices, identifies using the identifiers a switching device, among the switching devices, with which the network management apparatus has established the communication.

4. A network management apparatus according to claim 3, wherein the identifiers include data that, when the network management apparatus establishes the communication with any of the switching devices, exchanges between the network management apparatus and a switching device, among the switching devices, with which the network management apparatus has established the communication.

5. A method of managing first configuration information configured in a plurality of switching devices that relay data in a data communication network, the first configuration information including information to be determined in accordance with connectivity relationships among the switching devices, the method comprising:

detecting changes of connectivity relationships among the switching devices; and dynamically modifying the first configuration information in accordance with detected changes of connectivity relationships;

wherein at least one of the detecting and modifying operations is carried out in a network management apparatus;

the configuration information includes information set for each of the switching devices;

the configuration information modifying, in response to detecting a change of the connectivity relationship, acquires the configuration information from the switching device engaging the change, and modifies the first configuration information based on the acquired configuration information;

the configuration information includes information defining a setting used to make a routing decision based on a direction of a data communication; and wherein the detecting changes of connectivity relationships includes:

managing path information in a path information storage, which includes connectivity relationships among the switching devices;

receiving connectivity information from one of the switching devices, wherein the connectivity information indicates connectivity relationships between another one of the switching devices and the one of the switching devices;

comparing to acquire differences between connectivity relationships among the switching devices based on the received connectivity information, and connectivity relationships among the switching devices which have been recorded in the path information; and wherein the configuration information modifying modifies the first configuration information in accordance with the acquired differences;

acquiring second configuration information from one of the switching devices, wherein the second configuration information is currently configured in the one of the switching devices;

wherein the configuration information modifying, referring to the second configuration information, modifies the first configuration information;

when a change of the connectivity relationship is detected, the second configuration information is acquired from a switching device, among the switching devices, associated with the detected change of the connectivity relationship;

in the event that the first configuration information has been modified by the configuration information modifier, distributing the modified first configuration information to a switching device, among the switching devices, corresponding to the modification; and when a difference of a connectivity relationship as to a switching device with which the network management apparatus has established the communication is detected, the configuration information modifying modifies a connectivity relationship recorded in the path information as to the switching device with which the network management apparatus has established the communication so that the connectivity relationship accords with the received connectivity information.

6. A network management apparatus for managing a plurality of switching devices that relay data through a data communication network, the network management apparatus comprising:

a configuration information storage that stores first configuration information of the plurality of switching devices, wherein the first configuration information includes device-to-device path connectivity settings self-determined by the switching devices themselves, such path connectivity settings self-determined by the setting devices determined for storage in the configuration information storage via discovery of connectivity relationships stored in the switching devices;

a path connectivity relationship detector that detects changes of path connectivity relationships among the switching devices on a basis of an indication received from the switching devices; and a configuration information modifier that dynamically modifies the first configuration information in the network management apparatus, responsive to detected changes of path connectivity relationships as detected by the path connectivity relationship detector;

wherein the first configuration information includes path connectivity information set for each of the switching devices, defining a path connectivity setting within the switching device; and the configuration information modifier, in response to detecting a change of the path connectivity relationship, acquires the configuration information from a switching device indicating the change, and modifies the first configuration information based on the acquired configuration information;

the configuration information includes information defining a setting used to make a routing decision based on a direction of a data communication; and wherein the path connectivity relationship detector includes:

a path information storage for managing path information which includes connectivity relationships among the switching devices;

a connectivity information receiver that receives connectivity information from one of the switching devices, wherein the connectivity information indicates connectivity relationships between another one of the switching devices and the one of the switching devices;

a connectivity relationship comparator that acquires differences between connectivity relationships among the switching devices based on the received connectivity information, and connectivity relationships among the switching devices which have been recorded in the path information; and wherein the configuration information modifier modifies the first configuration information in accordance with the acquired differences;

a configuration information acquirer that acquires second configuration information from one of the switching devices, wherein the second configuration information is currently configured in the one of the switching devices;

wherein the configuration information modifier, referring to the second configuration information, modifies the first configuration information;

when a change of the connectivity relationship is detected, the configuration information acquirer acquires the second configuration information from a switching device, among the switching devices, associated with the detected change of the connectivity relationship;

a configuration information distributor that, in the event that the first configuration information has been modified by the configuration information modifier, distributes the modified first configuration information to a switching device, among the switching devices, corresponding to the modification; and when a difference of a connectivity relationship as to a switching device with which the network management apparatus has established the communication is detected, the configuration information modifier modifies a connectivity relationship recorded in the path information as to the switching device with which the network management apparatus has established the communication so that the connectivity relationship accords with the received connectivity information.

* * * * *